(12) United States Patent
Mizuno et al.

(10) Patent No.: US 12,550,622 B2
(45) Date of Patent: Feb. 10, 2026

(54) OPTICAL DEVICE AND OPTICAL SYSTEM

(71) Applicant: TDK CORPORATION, Tokyo (JP)

(72) Inventors: Tomohito Mizuno, Tokyo (JP); Hideaki Fukuzawa, Tokyo (JP); Tetsuya Shibata, Tokyo (JP)

(73) Assignee: TDK CORPORATION, Tokyo (JP)

( * ) Notice: Subject to any disclaimer, the term of this patent is extended or adjusted under 35 U.S.C. 154(b) by 428 days.

(21) Appl. No.: 18/108,046

(22) Filed: Feb. 10, 2023

(65) Prior Publication Data

US 2023/0301196 A1   Sep. 21, 2023

(30) Foreign Application Priority Data

Feb. 14, 2022 (JP) .................................. 2022-020316

(51) Int. Cl.
*H10N 50/10* (2023.01)
*H10N 50/85* (2023.01)

(52) U.S. Cl.
CPC ............. *H10N 50/10* (2023.02); *H10N 50/85* (2023.02)

(58) Field of Classification Search
CPC ............................... H10N 50/10; H10N 50/85
USPC ......................................................... 257/295
See application file for complete search history.

(56) References Cited

U.S. PATENT DOCUMENTS

| | | | | |
|---|---|---|---|---|
| 5,793,743 A * | 8/1998 | Duerig | ................. | G11B 11/007 369/13.01 |
| 6,429,941 B1 | 8/2002 | Kamon et al. | | |
| 7,876,484 B2 * | 1/2011 | Mizoguchi | ........... | G02B 26/085 359/224.1 |
| 11,067,826 B2 * | 7/2021 | Shinohara | .............. | G02B 6/003 |
| 2016/0061939 A1 | 3/2016 | Eno | | |
| 2020/0241135 A1 * | 7/2020 | Litvak | .................... | G08C 23/04 |
| 2021/0262794 A1 | 8/2021 | Ishikawa et al. | | |
| 2022/0131612 A1 * | 4/2022 | Fukuzawa | .............. | H04B 10/40 |
| 2022/0182070 A1 * | 6/2022 | Fan | ........................ | H03M 7/008 |
| 2023/0304855 A1 * | 9/2023 | Yamane | .................... | G01J 1/42 |

FOREIGN PATENT DOCUMENTS

| | | |
|---|---|---|
| CN | 105388483 A | 3/2016 |
| JP | H08-78703 A | 3/1996 |
| JP | 2000-028721 A | 1/2000 |
| JP | 2011-180355 A | 9/2011 |

(Continued)

OTHER PUBLICATIONS

Chen, Jun-Yang et al., "All-Optical Switching of Magnetic Tunnel Junctions with Single Subpicosecond Laser Pulses", Physical Review Applied, vol. 7, 021001, 2017.

*Primary Examiner* — Jami Valentine Miller
(74) *Attorney, Agent, or Firm* — Oliff PLC

(57) ABSTRACT

This optical device includes a light-emitting unit that is configured to emit a light; a first magnetic element; and a circuit, wherein the first magnetic element includes a first ferromagnetic layer, a second ferromagnetic layer, and a spacer layer sandwiched between the first ferromagnetic layer and the second ferromagnetic layer, a reflected light reflected by an object to be irradiated with the light is applied to the first magnetic element, a first signal corresponding to an emission of the light from the light-emitting unit is input to the circuit, and a second signal corresponding to an application of the reflected light to the first magnetic element is input from the first magnetic element to the circuit.

8 Claims, 14 Drawing Sheets

(56) References Cited

FOREIGN PATENT DOCUMENTS

| | | |
|---|---|---|
| JP | 2019-219329 A | 12/2019 |
| JP | 2020-034386 A | 3/2020 |
| JP | 2021-128084 A | 9/2021 |

\* cited by examiner

OPTICAL DEVICE AND OPTICAL SYSTEM

CROSS-REFERENCES TO RELATED APPLICATIONS

This application relies for priority upon Japanese Patent Application No. 2022-020316, filed on Feb. 14, 2022 the entire content of which is hereby incorporated herein by reference for all purposes as if fully set forth herein.

BACKGROUND

The present disclosure relates to an optical device and an optical system.

DESCRIPTION OF RELATED ART

A photoelectric conversion element is used in a variety of applications.

For example, Patent Document 1a describes a ranging device in which reflected light from a reflector is received by a photodiode, and a distance to an object, that is, the reflector, is measured. This ranging device uses a technique of light detection and ranging (LiDAR).

PATENT DOCUMENTS

[Patent Document 1] Japanese Unexamined Patent Application, First Publication No. 2021-128084

SUMMARY

Optical sensors using semiconductor pn junctions are widely used, but new breakthroughs are required for further development.

It is desirable to provide a novel optical device and optical system.

The following means are provided.

An optical device includes: a light-emitting unit that is configured to emit a light; a first magnetic element; and a circuit, wherein the first magnetic element includes a first ferromagnetic layer, a second ferromagnetic layer, and a spacer layer sandwiched between the first ferromagnetic layer and the second ferromagnetic layer, a reflected light reflected by an object to be irradiated with the light is applied to the first magnetic element, a first signal corresponding to an emission of the light from the light-emitting unit is input to the circuit, and a second signal corresponding to an application of the reflected light to the first magnetic element is input from the first magnetic element to the circuit.

An optical system includes the optical device mentioned above, wherein a time difference between: an emission of the light by the light-emitting unit; and an application of the reflected light to the first magnetic element, is obtained on a basis of the first signal and the second signal input to the circuit.

An optical system incudes the optical device mentioned above, wherein a stereoscopic image of the object is obtained from the reflected light.

DETAILED DESCRIPTION

Figure 1:
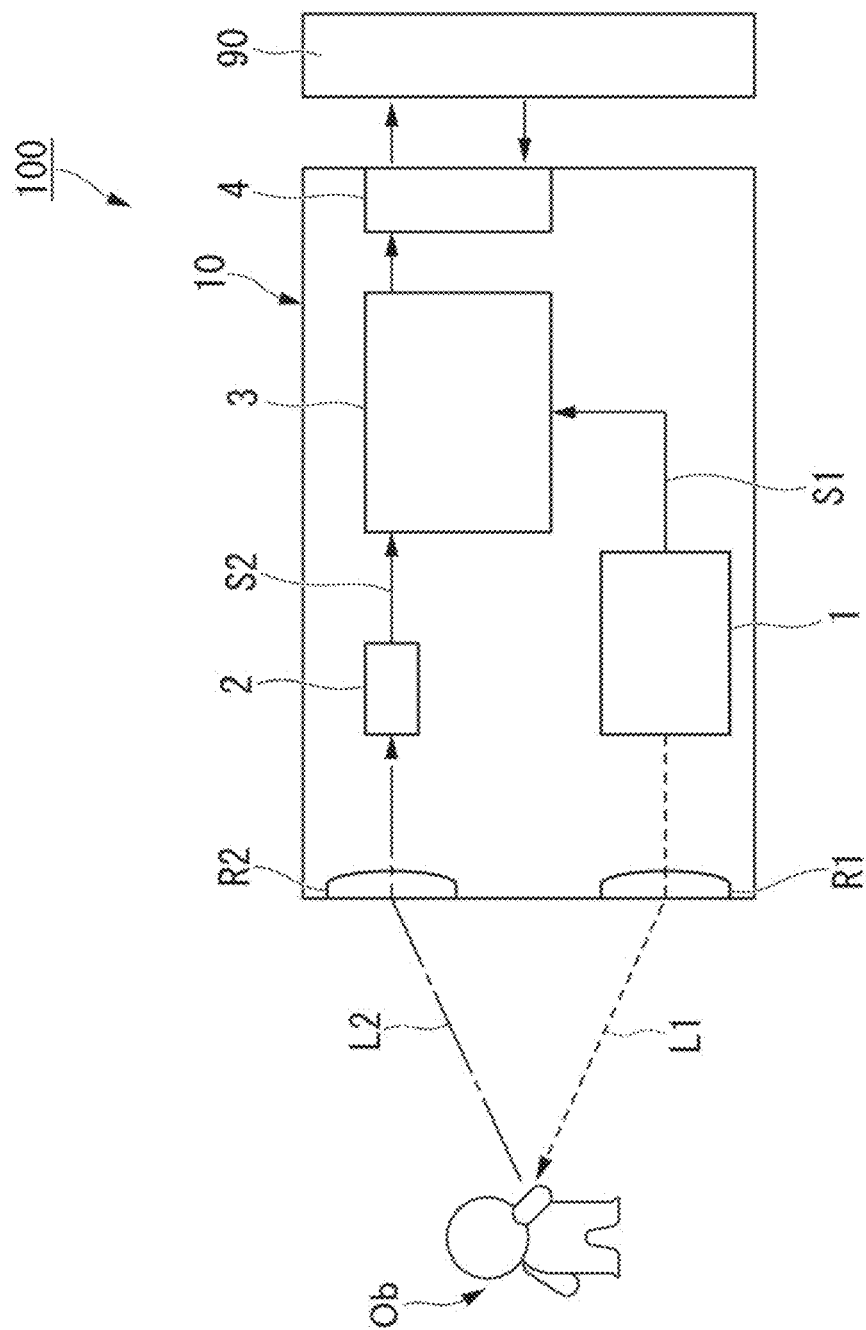
FIG. 1 is a schematic diagram of an optical system according to a first embodiment.

Embodiments will be described in detail with reference to the drawings as appropriate. In the drawings used in the following description, featured portions may be shown in an enlarged manner for convenience in order to make the features easier to understand, and dimensional ratios of constituent elements may be different from actual ones. Materials, dimensions, and the like exemplified in the following description are examples, and the present disclosure is not limited to them and can be implemented with appropriate modifications within the scope of effects of the present disclosure.

The optical device and optical system described in the present disclosure operate on a novel principle.

Directions will be defined. A laminating direction of a first magnetic element 2 is defined as a z direction, one direction in a plane perpendicular to the z direction is defined as an x direction, and a direction perpendicular to the x direction and the z direction is defined as a y direction. A +z direction may be expressed as "upward" and a −z direction as "downward." The +z direction is a direction from a second electrode E2 to a first electrode E1. Upward and downward do not necessarily coincide with directions in which gravity is applied.

First Embodiment

FIG. 1 is a schematic diagram of an optical system 100 according to a first embodiment. The optical system 100 includes, for example, an optical device 10 and an external device 90. The optical system 100 uses light emitted by a light-emitting unit 1 of the optical device 10 (hereinafter referred to as light L1) and light reflected by an object to be irradiated with the light Ob (hereinafter referred to as reflected light L2) to obtain a distance to the object to be irradiated Ob, a stereoscopic image of the object Ob, and the like. The light L1 is emitted light that is emitted from the light-emitting unit 1.

The term "light" in the present specification is not limited to visible light, but also includes infrared rays with longer wavelengths than visible light rays and ultraviolet rays with shorter wavelengths than visible light rays. A wavelength of visible light is, for example, at least 380 nm and less than 800 nm. A wavelength of infrared rays is, for example, at least 800 nm and at most 1 mm. A wavelength of ultraviolet rays is, for example, at least 200 nm and less than 380 nm.

The optical device 10 includes, for example, a light-emitting unit 1, a first magnetic element 2, a circuit 3, an external interface 4, and lenses R1 and R2.

The light-emitting unit 1 has a laser light source. The light-emitting unit 1 is connected to a power supply when used. The power supply may be inside the light-emitting unit 1. The laser light source emits laser light having a pulse shape with a predetermined time width at predetermined intervals. The light L1 emitted by the light-emitting unit 1 becomes collimated light via the lens R1. The light L1 is applied to the object to be irradiated Ob. The lens R1 is, for example, a collimator lens.

The light-emitting unit 1 is configured to emit light. The reflected light L2 reflected by the object Ob is applied to the first magnetic element 2. One or more first magnetic elements 2 may be provided. For example, the first magnetic elements 2 are arranged one-dimensionally or two-dimensionally along a plane intersecting an irradiating direction of the reflected light L2, and the arranged first magnetic elements 2 may be irradiated with the reflected light L2. The reflected light L2 is condensed by the lens R2 and applied to the first magnetic element 2. The lens R2 is, for example, a focus lens. In order to prevent ambient light from entering from the lens R2 and irradiating the first magnetic element 2, a wavelength filter for blocking the ambient light may be provided immediately before the lens R2 or between the lens R2 and the first magnetic element 2 on an optical path of the reflected light L2.

Figure 2:
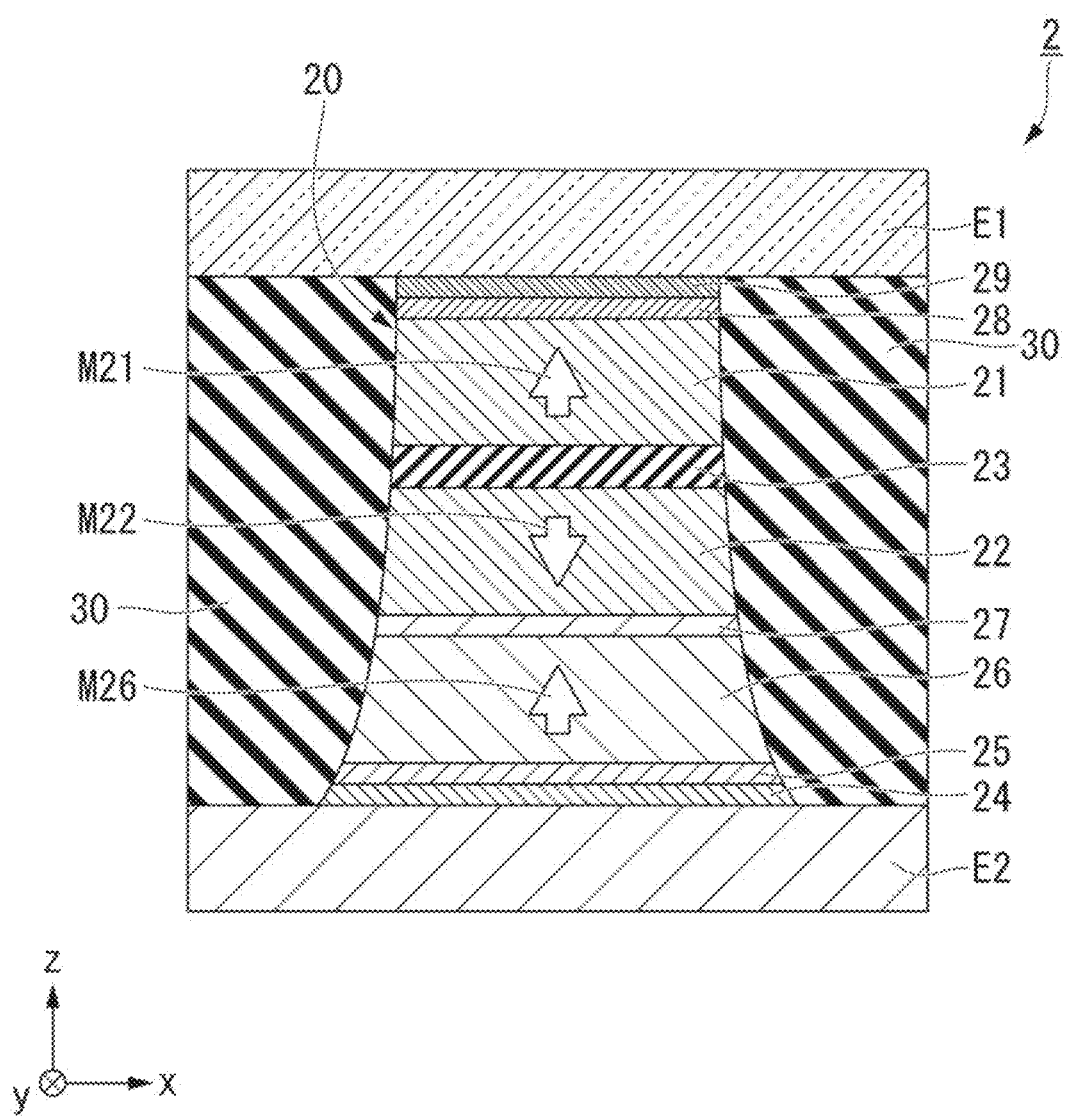
FIG. 2 is a cross-sectional view of a first magnetic element according to the first embodiment.

FIG. 2 is a cross-sectional view of the first magnetic element 2 according to the first embodiment. In FIG. 2, directions of magnetization in initial states of ferromagnetic materials are indicated by arrows.

The first magnetic element 2 has at least a first ferromagnetic layer 21, a second ferromagnetic layer 22, and a spacer layer 23. The spacer layer 23 is located between the first ferromagnetic layer 21 and the second ferromagnetic layer 22. In addition to these, the first magnetic element 2 may also have a buffer layer 24, a seed layer 25, a ferromagnetic layer 26, a magnetic coupling layer 27, a perpendicular magnetization inducing layer 28, a cap layer 29, and an insulating layer 30. The buffer layer 24, the seed layer 25, the ferromagnetic layer 26, and the magnetic coupling layer 27 are located between the second ferromagnetic layer 22 and a second electrode E2, and the perpendicular magnetization inducing layer 28 and the cap layer 29 are located between the first ferromagnetic layer 21 and a first electrode E1. The insulating layer 30 is located between the first electrode E1 and the second electrode E2 and covers a periphery of a laminate 20.

The first magnetic element 2 is, for example, a magnetic tunnel junction (MTJ) element in which the spacer layer 23 is made of an insulating material. A resistance value of the first magnetic element 2 changes when light is applied to the first magnetic element 2 from the outside. A resistance value of the first magnetic element 2 in the z direction (a resistance value thereof when a current flows in the z direction) changes depending on a relative change between a state of magnetization M21 of the first ferromagnetic layer 21 and a state of magnetization M22 of the second ferromagnetic layer 22. Such an element is also called a magnetoresistance effect element.

The first ferromagnetic layer 21 is a photodetection layer of which a state of magnetization changes when light is applied to the first ferromagnetic layer 21 from the outside. The first ferromagnetic layer 21 is also called a magnetization free layer. The magnetization free layer is a layer containing a magnetic material of which a state of magnetization changes when a predetermined external energy is applied. The predetermined external energy is, for example, light applied from the outside, a current flowing in the laminating direction of the first magnetic element 2, or an external magnetic field. The state of the magnetization M21 of the first ferromagnetic layer 21 changes in accordance with an intensity of the applied light.

The first ferromagnetic layer 21 contains a ferromagnetic material. The first ferromagnetic layer 21 contains at least one magnetic element such as Co, Fe, or Ni, for example. The first ferromagnetic layer 21 may contain elements such as B, Mg, Hf, and Gd together with the magnetic elements as described above. The first ferromagnetic layer 21 may be, for example, an alloy containing a magnetic element and a non-magnetic element. The first ferromagnetic layer 21 may be configured of a plurality of layers. The first ferromagnetic layer 21 is, for example, a CoFeB alloy, a laminate in which a CoFeB alloy layer is sandwiched between Fe layers, or a laminate in which a CoFeB alloy layer is sandwiched between CoFe layers. In general, "ferromagnetism" includes "ferrimagnetism." The first ferromagnetic layer 21 may exhibit ferrimagnetism. On the other hand, the first ferromagnetic layer 21 may exhibit ferromagnetism rather than ferrimagnetism. For example, the CoFeB alloy exhibits ferromagnetism rather than ferrimagnetism.

The first ferromagnetic layer 21 may be an in-plane magnetization film having a magnetization easy axis in an in-plane direction (any direction in an xy plane) of a film surface thereof, or may be a perpendicular magnetization film having a magnetization easy axis in a direction perpendicular to the film surface (z direction).

A film thickness of the first ferromagnetic layer 21 is, for example, at least 1 nm and at most 5 nm. The film thickness of the first ferromagnetic layer 21 may be, for example, at least 1 nm and at most 2 nm. In a case in which the first ferromagnetic layer 21 is a perpendicular magnetization film, when the film thickness of the first ferromagnetic layer 21 is small, the effect of applying perpendicular magnetic anisotropy from layers above and below the first ferromagnetic layer 21 is enhanced, and the perpendicular magnetic anisotropy of the first ferromagnetic layer 21 increases. That is, when the perpendicular magnetic anisotropy of the first ferromagnetic layer 21 is high, the force that causes the magnetization M21 to return to the z direction increases. On the other hand, when the film thickness of the first ferromagnetic layer 21 is large, the effect of applying the perpendicular magnetic anisotropy from the layers above and below the first ferromagnetic layer 21 is relatively weakened, and the perpendicular magnetic anisotropy of the first ferromagnetic layer 21 is weakened.

When the film thickness of the first ferromagnetic layer 21 becomes smaller, a volume of the ferromagnetic material decreases, and when the film thickness of the first ferromagnetic layer 21 becomes larger, the volume of the ferromagnetic material increases. Responsiveness of the magnetization of the first ferromagnetic layer 1 when an external energy is applied is inversely proportional to a product (KuV) of magnetic anisotropy (Ku) and a volume (V) of the first ferromagnetic layer 21. That is, when the product of the magnetic anisotropy and the volume of the first ferromagnetic layer 21 decreases, responsiveness to light increases. From this point of view, the volume of the first ferromagnetic layer 21 may be reduced in addition to appropriately designing the magnetic anisotropy of the first ferromagnetic layer 21, in order to enhance the response to light.

In a case in which the film thickness of the first ferromagnetic layer 21 is larger than 2 nm, an insertion layer made of, for example, Mo or W may be provided in the first ferromagnetic layer 21. That is, the first ferromagnetic layer 21 may be configured of a laminate in which a ferromagnetic layer, an insertion layer, and a ferromagnetic layer are sequentially laminated in the z direction. Perpendicular magnetic anisotropy of the entire first ferromagnetic layer 21 increases due to interfacial magnetic anisotropy at interfaces between the insertion layer and the ferromagnetic layers. A film thickness of the insertion layer is, for example, 0.1 nm to 1.0 nm.

The second ferromagnetic layer 22 is a magnetization pinned layer. The magnetization pinned layer is a layer made of a magnetic material of which a state of magnetization is less likely to change than that of the magnetization free layer when a predetermined external energy is applied.

For example, a direction of magnetization of the magnetization pinned layer is less likely to change than a direction of magnetization of the magnetization free layer when a predetermined external energy is applied. Also, for example, a magnitude of magnetization of the magnetization pinned layer is less likely to change than that of the magnetization free layer when a predetermined external energy is applied. A coercive force of the second ferromagnetic layer 22 is, for example, greater than a coercive force of the first ferromagnetic layer 21. The second ferromagnetic layer 22 has a magnetization easy axis in the same direction as the first ferromagnetic layer 21, for example. The second ferromagnetic layer 22 may be an in-plane magnetization film or a perpendicular magnetization film.

A material forming the second ferromagnetic layer 22 is, for example, the same as that of the first ferromagnetic layer 21. The second ferromagnetic layer 22 may be, for example, a multilayer film in which Co with a thickness of 0.4 nm to 1.0 nm and Pt with a thickness of 0.4 nm to 1.0 nm are alternately laminated several times. The second ferromagnetic layer 22 may be a laminate in which Co with a thickness of 0.4 nm to 1.0 nm, Mo with a thickness of 0.1 nm to 0.5 nm, a CoFeB alloy with a thickness of 0.3 nm to 1.0 nm, and Fe with a thickness of 0.3 nm to 1.0 nm are laminated in order, for example.

The magnetization of the second ferromagnetic layer 22 may be pinned, for example, by magnetic coupling with the ferromagnetic layer 26 with the magnetic coupling layer 27 sandwiched therebetween. In this case, a combination of the second ferromagnetic layer 22, the magnetic coupling layer 27 and the ferromagnetic layer 26 may be called a magnetization pinned layer. Details of the magnetic coupling layer 27 and the ferromagnetic layer 26 will be described later.

The spacer layer 23 is a layer disposed between the first ferromagnetic layer 21 and the second ferromagnetic layer 22. The spacer layer 23 is configured of a layer made of a conductor, an insulator, or a semiconductor, or a layer including a current-carrying point made of a conductor in an insulator. The spacer layer 23 is, for example, a non-magnetic layer. A film thickness of the spacer layer 23 can be adjusted in accordance with oriented directions of the magnetization of the first ferromagnetic layer 21 and the magnetization of the second ferromagnetic layer 22 in their initial states, which will be described later.

In a case in which the spacer layer 23 is made of an insulating material, a material containing aluminum oxide, magnesium oxide, titanium oxide, silicon oxide, or the like can be used for the material of the spacer layer 23. Also, these insulating materials may contain elements such as Al, B, Si, and Mg. and magnetic elements such as Co, Fe, and Ni. By adjusting the film thickness of the spacer layer 23 such that a high TMR effect is exhibited between the first ferromagnetic layer 21 and the second ferromagnetic layer 22, a high magnetoresistance change rate can be obtained. In order to efficiently utilize the TMR effect, the film thickness of the spacer layer 23 may be about 0.5 to 5.0 nm, or about 1.0 to 2.5 nm.

In a case in which the spacer layer 23 is made of a non-magnetic conductive material, a conductive material such as Cu, Ag, Au or Ru can be used. In order to efficiently utilize a GMR effect, the film thickness of the spacer layer 23 may be about 0.5 to 5.0 nm, or about 2.0 to 3.0 nm.

In a case in which the spacer layer 23 is made of a nonmagnetic semiconductor material, a material such as zinc oxide, indium oxide, tin oxide, germanium oxide, gallium oxide, or ITO can be used. In this case, the film thickness of the spacer layer 23 may be about 1.0 to 4.0 nm.

In the case of adopting a layer including a current-carrying point made of a conductor in a nonmagnetic insulator as the spacer layer 23, a structure may be adopted in which a current-carrying point made of a non-magnetic conductor such as Cu, Au, or Al is included in a non-magnetic insulator made of aluminum oxide or magnesium oxide. Also, the conductor may be made of a magnetic element such as Co, Fe, or Ni. In this case, the film thickness of the spacer layer 23 may be about 1.0 to 2.5 nm. The current-carrying point is, for example, a columnar body having a diameter of at least 1 nm and at most 5 nm when viewed in a direction perpendicular to the film surface.

The ferromagnetic layer 26 is magnetically coupled with the second ferromagnetic layer 22, for example. The magnetic coupling is, for example, antiferromagnetic coupling and is caused by RKKY interactions. A direction of the magnetization M22 of the second ferromagnetic layer 22 and a direction of a magnetization M26 of the ferromagnetic layer 26 are antiparallel to each other. A material forming the ferromagnetic layer 26 is, for example, the same as that of the first ferromagnetic layer 21.

The magnetic coupling layer 27 is located between the second ferromagnetic layer 22 and the ferromagnetic layer 26. The magnetic coupling layer 27 is made of Ru, Ir, or the like, for example.

The buffer layer 24 is a layer for relaxing lattice mismatch between different crystals. The buffer layer 24 is made of, for example, a metal containing at least one element selected from the group consisting of Ta, Ti, Zr, and Cr, or a nitride containing at least one element selected from the group consisting of Ta, Ti, Zr, and Cu. More specifically, the buffer layer 24 is made of, for example, Ta (a single element), an NiCr alloy, TaN (a tantalum nitride), or CuN (a copper nitride). The film thickness of the buffer layer 24 is, for example, at least 1 nm and at most 5 nm. The buffer layer 24 is amorphous, for example.

The buffer layer 24 is located, for example, between the seed layer 25 and the second electrode E2 and is in contact with the second electrode E2. The buffer layer 24 inhibits an influence of a crystal structure of the second electrode E2 on a crystal structure of the second ferromagnetic layer 22.

The seed layer 25 enhances crystallinity of a layer laminated on the seed layer 25. The seed layer 25 is located, for example, between the buffer layer 24 and the ferromagnetic layer 26 and lies on the buffer layer 24. The seed layer 25 is made of, for example, Pt, Ru, Zr, NiFeCr. A film thickness of the seed layer 25 is, for example, at least 1 nm and at most 5 nm.

The cap layer 29 lies between the first ferromagnetic layer 21 and the first electrode E1. The cap layer 29 may include the perpendicular magnetization inducing layer 28 that is laminated on the first ferromagnetic layer 21 and in contact with the first ferromagnetic layer 21. The cap layer 29 prevents damage to an underlying layer in the course of processes and enhances crystallinity of the underlying layer at the time of annealing. A film thickness of the cap layer 29 is, for example, at most 10 nm so that the first ferromagnetic layer 21 is sufficiently irradiated with light.

The perpendicular magnetization inducing layer 28 induces perpendicular magnetic anisotropy of the first ferromagnetic layer 21. The perpendicular magnetization inducing layer 28 is made of, for example, magnesium oxide, W, Ta, Mo, or the like. In a case in which the perpendicular magnetization inducing layer 28 is magnesium oxide, the magnesium oxide may be oxygen-deficient in order to increase its conductivity. A film thickness of the perpendicular magnetization inducing layer 28 is, for example, at least 0.5 nm and at most 5.0 nm.

The insulating layer 30 is made of, for example, an oxide, a nitride, or an oxynitride of Si, Al, or Mg. The insulating layer 30 is made of, for example, silicon oxide ($SiO_x$), silicon nitride ($SiN_x$), silicon carbide (SiC), chromium nitride, silicon carbonitride (SiCN), silicon oxynitride (SiON), aluminum oxide ($Al_2O_3$), zirconium oxide ($ZrO_x$), or the like.

The first electrode E1 is disposed, for example, on the side in which light is applied to the first magnetic element 2. The reflected light L2 is applied to the first magnetic element 2 from the first electrode E1 side and applied to at least the first ferromagnetic layer 21. The first electrode E1 is made of a conductive material. The first electrode E1 is, for example, a transparent electrode that is transparent to light in a wavelength range used. The first electrode E1 may transmit, for example, at least 80% of the light in the wavelength range used. The first electrode E1 is made of, for example, an oxide such as indium tin oxide (ITO), indium zinc oxide (IZO), zinc oxide (ZnO), or indium gallium zinc oxide (IGZO). The first electrode E1 may be configured to have a plurality of columnar metals in transparent electrode materials of these oxides. It is not essential to use the transparent electrode materials as described above for the first electrode E1, and by using a metal material such as Au, Cu, or Al with a thin film thickness, the applied light may be caused to reach the first ferromagnetic layer 21. In a case in which a metal is used for the material of the first electrode E1, a film thickness of the first electrode E1 is, for example, 3 to 10 nm. Also, the first electrode E1 may have an antireflection film on an irradiation surface irradiated with light.

The second electrode E2 lies on a side opposite to the first electrode E1 with the laminate 20 interposed therebetween. The second electrode E2 is made of a conductive material. The second electrode E2 is made of a metal such as Cu, Al, or Au, for example. Ta or Ti may be laminated above and below these metals. Alternatively, a laminated film of Cu and Ta, a laminated film of Ta, Cu, and Ti, or a laminated film of Ta, Cu, and TaN may be used. Alternatively, TiN or TaN may be used for the second electrode E2. A film thickness of the second electrode E2 is, for example, 200 nm to 800 nm.

The second electrode E2 may be transparent to the light applied to the first magnetic element 2. For a material of the second electrode E2, similar to the first electrode E1, for example, a transparent electrode material made of an oxide such as indium tin oxide (ITO), indium zinc oxide (IZO), zinc oxide (ZnO), or indium gallium zinc oxide (IGZO) may be used. Even in a case in which light is emitted from the first electrode E1 side, the light may reach the second electrode E2 depending on an intensity of the light, but in this case, since the second electrode E2 is configured to include the transparent electrode material made of the oxide, light reflection at an interface between the second electrode E2 and a layer in contact therewith can be inhibited as compared to the case in which the second electrode E2 is made of a metal.

A first signal S1 and a second signal S2, which are electric signals, are input to the circuit 3. The first signal S1 is input from the light-emitting unit 1 to the circuit 3, for example. The first signal S1 is a signal corresponding to light emission of the light-emitting unit 1. The first signal S1 is, for example, a part of a voltage signal applied to the laser light source from the power supply when the laser light source of the light-emitting unit 1 emits pulsed light. The first signal S1 is a signal corresponding to a timing at which the light L1 is emitted from the light-emitting unit 1. The second signal S2 is input from the first magnetic element 2 to the circuit 3, for example. The second signal S2 is a signal corresponding to the application of the reflected light L2 to the first magnetic element 2. The second signal S2 is, for example, a part of an output voltage generated from the first magnetic element 2 when the reflected light L2 is applied to the first magnetic element 2. The second signal S2 is a signal corresponding to an irradiation timing of the first magnetic element 2 with the reflected light L2.

The circuit 3 has, for example, a signal receiving unit, a counter, a processor, and a memory. The signal receiving unit has an input terminal to which the first signal S1 or the second signal S2 is input. There may be two separate input terminals, i.e., an input terminal to which the first signal S1 is input and an input terminal to which the second signal S2 is input, or there may be one common input terminal to which both of the first signal Si and the second signal S2 are input. The signal receiving unit may further include, for example, an amplifier that amplifies a signal input to the input terminal. The processor is, for example, a central processing unit (CPU). The counter counts clock pulses for CPU operation. The memory stores, for example, the number of counts when the first signal Si is received by the signal receiving unit and the number of counts when the second signal S2 is received by the signal receiving unit. Although details will be described later, the optical system 100 uses the counter, the processor, and the memory to obtain a time difference ΔT between the emission of the light L1 from the light-emitting unit 1 and the application of the reflected light L2 to the first magnetic element 2, a distance between the optical device 10 and the object Ob, and the stereoscopic image of the object Ob.

Here, an example in which the counter, the processor, and the memory are included in the circuit 3 has been shown, an example in which these configurations are included in the external device 90 and not included in the circuit 3 may be adopted.

The external interface 4 communicates with the external device 90. The communication between the external interface 4 and the external device 90 may be wireless or wired. The external interface 4 is a communication adapter that establishes the communication with the external device 90.

The external device 90 includes, for example, a computer, a control device, and the like. The computer is, for example, an information processing device including a central processing unit (CPU). The control device controls other devices on the basis of signals from the optical device 10. For example, in a case in which the optical system 100 is incorporated in an automobile, it controls control systems such as brakes of the automobile on the basis of information about the distance between the optical device 10 and the object to be irradiated Ob, which is transmitted from the optical device 10. Also, as described above, the external device 90 may have an arithmetic device for obtaining the time difference ΔT between the emission of the light L1 from the light-emitting unit 1 and the application of the reflected light L2 to the first magnetic element 2, the distance between the optical device 10 and the object Ob, and the stereoscopic image of the object Ob.

Next, operations of the optical system 100 according to the first embodiment will be described. First, the light-emitting unit 1 emits pulse laser. The first signal S1 corresponding to the emission of the light L1 in the light-emitting unit 1 is input to the circuit 3. The first signal S1 is received by the signal receiving unit, and the memory stores the number of counts when the signal receiving unit receives the first signal Si.

A part of the light L1 becomes collimated light via the lens R1 and is emitted onto the object Ob. The reflected light L2 reflected by the object Ob is condensed by the lens R2 and applied to the first magnetic element 2. When the reflected light L2 is applied to the first magnetic element 2, the first magnetic element 2 generates an output voltage. That is, the first magnetic element 2 converts the applied light into an electric signal.

Figure 3:
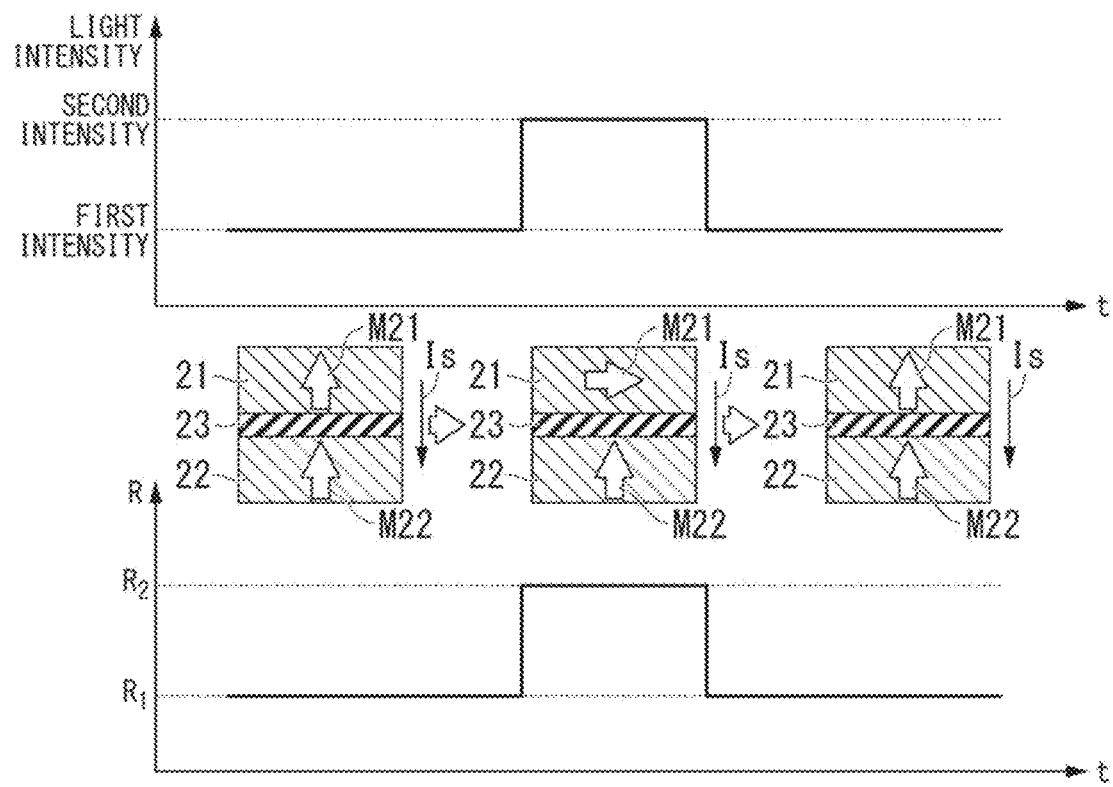
FIG. 3 is a diagram for describing a first mechanism of an operation of the first magnetic element according to the first embodiment.
Figure 4:
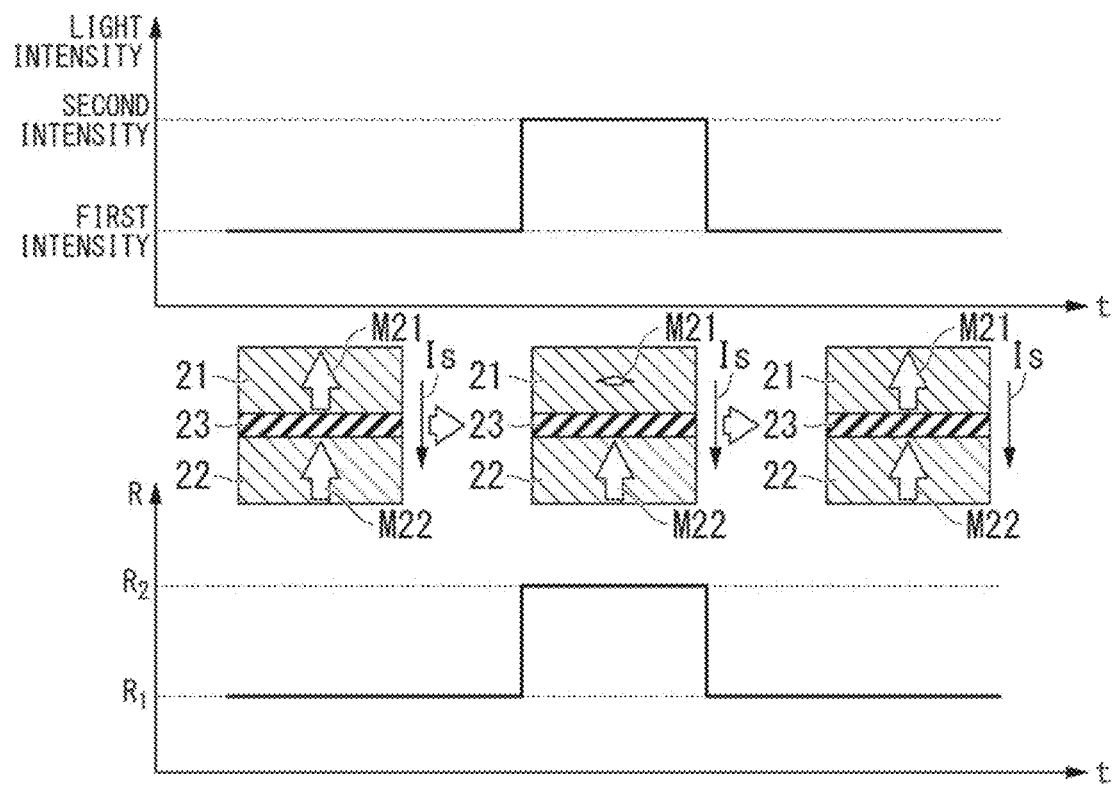
FIG. 4 is a diagram for describing a second mechanism of an operation of the first magnetic element according to the first embodiment.

FIG. 3 is a diagram for describing a first mechanism of an operation of the first magnetic element 2 according to the first embodiment. FIG. 4 is a diagram for describing a second mechanism of an operation of the first magnetic element 2 according to the first embodiment. In FIGS. 3 and 4, only the first ferromagnetic layer 21, the second ferromagnetic layer 22 and the spacer layer 23 of the first magnetic element 2 are extracted and illustrated. In the upper graphs of FIGS. 3 and 4, the vertical axis represents an intensity of the reflected light L2 applied to the first ferromagnetic layer 1, and the horizontal axis represents time. In the lower graphs of FIGS. 3 and 4, the vertical axis is a resistance value of the first magnetic element 2 in the z direction, and the horizontal axis is time.

The output voltage from the first magnetic element 2 changes in accordance with a change in the intensity of the reflected light L2 that is applied to the first ferromagnetic layer 21. What contributes to the change in the output voltage from the first magnetic element 2 are changes in resistance values of the first ferromagnetic layer 21, the second ferromagnetic layer 22, and the spacer layer 23 in the laminating direction. Here, an example in which the intensity of the light applied to the first ferromagnetic layer 21 has two levels of a first intensity and a second intensity will be described. The intensity of the light of the second intensity is greater than the intensity of the light of the first intensity.

The first intensity may be an intensity when the intensity of the light applied to the first ferromagnetic layer 21 is zero.

First, in a state in which the light of the first intensity (hereinafter referred to as an initial state) is applied to the first ferromagnetic layer 21, the magnetization M21 of the first ferromagnetic layer 21 and the magnetization M22 of the second ferromagnetic layer 22 are in a parallel relationship, the resistance value of the first magnetic element 2 in the z direction exhibits a first resistance value R1, and a magnitude of the output voltage from the first magnetic element 2 exhibits a first value. The resistance value of the first magnetic element 2 in the z direction is obtained by passing a sense current Is in the z direction of the first magnetic element 2 to generate a voltage at both ends of the first magnetic element 2 in the z direction and using Ohm's law from its voltage value. The output voltage from the first magnetic element 2 is generated between the first electrode E1 and the second electrode E2. In the example shown in FIG. 3, the sense current Is is caused to flow from the first ferromagnetic layer 21 toward the second ferromagnetic layer 22. By passing the sense current Is in this direction, a spin transfer torque in the same direction as the magnetization M22 of the second ferromagnetic layer 22 acts on the magnetization M21 of the first ferromagnetic layer 21, and the magnetization M21 and magnetization M22 becomes parallel thereto in the initial state. Also, by passing the sense current Is in this direction, it is possible to prevent the magnetization M21 of the first ferromagnetic layer 21 from reversing during being operated.

Next, the intensity of the reflected light L2 applied to the first ferromagnetic layer 21 changes from the first intensity to the second intensity. The second intensity is greater than the first intensity, and the magnetization M21 of the first ferromagnetic layer 21 changes from the initial state. The state of magnetization M21 of the first ferromagnetic layer 21 without light application differs from the state of magnetization M21 of the first ferromagnetic layer 21 with light application. The state of magnetization M21 includes, for example, a tilt angle with respect to the z direction, a magnitude, and the like.

For example, as shown in FIG. 3, when the intensity of the light applied to the first ferromagnetic layer 21 changes from the first intensity to the second intensity, the magnetization M21 is tilted with respect to the z direction. Also, for example, as shown in FIG. 4, when the intensity of the light applied to the first ferromagnetic layer 21 changes from the first intensity to the second intensity, the magnitude of the magnetization M21 decreases. For example, when the magnetization M21 of the first ferromagnetic layer 21 is tilted with respect to the z direction due to the irradiation intensity of the light, the tilt angle is greater than 0° and less than 90°.

When the magnetization M21 of the first ferromagnetic layer 21 changes from the initial state, the resistance value of the first magnetic element 2 in the z direction indicates a second resistance value R2, and the magnitude of the output voltage from the first magnetic element 2 indicates a second value. The second resistance value R2 is greater than the first resistance value R1, and the second value of the output voltage is greater than the first value. The second resistance value R2 is between a resistance value (the first resistance value R1) when the magnetization M21 and the magnetization M22 are parallel to each other and a resistance value when the magnetization M21 and the magnetization M22 are antiparallel to each other.

In the case shown in FIG. 4, the spin transfer torque in the same direction as the magnetization M22 of the second ferromagnetic layer 22 is acting on the magnetization M21 of the first ferromagnetic layer 21. Accordingly, the magnetization M21 tries to return to a parallel state with the magnetization M22, and when the intensity of the light applied to the first ferromagnetic layer 21 changes from the second intensity to the first intensity, the first magnetic element 2 returns to its initial state. In the case shown in FIG. 4, when the intensity of the light applied to the first ferromagnetic layer 21 returns to the first intensity, the magnetization M21 of the first ferromagnetic layer 21 returns to its original magnitude, and the first magnetic element 2 returns to its initial state. In either case, the resistance value of the first magnetic element 2 in the z direction returns to the first resistance value R1. That is, when the intensity of the light applied to the first ferromagnetic layer 21 changes from the second intensity to the first intensity, the resistance value of the first magnetic element 2 in the z direction changes from the second resistance value R2 to the first resistance value R1, and the magnitude of the output voltage from the first magnetic element 2 changes from the second value to the first value.

The output voltage from the first magnetic element 2 changes in accordance with the change in the intensity of the light applied to the first ferromagnetic layer 21 irradiated, and the change in the intensity of the applied light can be converted into the change in the output voltage from the first magnetic element 2. The first magnetic element 2 converts the intensity of the light applied to the first ferromagnetic layer 21 into the output voltage from the first magnetic element 2 corresponding to the intensity. That is, the first magnetic element 2 can convert light into an electric signal.

Although the case in which the magnetization M21 and the magnetization M22 are parallel to each other in the initial state has been described as an example, the magnetization M21 and the magnetization M22 may be antiparallel to each other in the initial state. In this case, the resistance value of the first magnetic element 2 in the z direction decreases as the state of the magnetization M21 changes (for example, as a change in the angle from the initial state of the magnetization M21 increases). In a case in which the case in which the magnetization M21 and the magnetization M22 are antiparallel to each other is set to the initial state, the sense current Is may flow from the second ferromagnetic layer 22 toward the first ferromagnetic layer 21. By passing the sense current Is in this direction, a spin transfer torque in a direction opposite to the magnetization M22 of the second ferromagnetic layer 22 acts on the magnetization M21 of the first ferromagnetic layer 21, and the magnetization M21 and the magnetization M22 becomes antiparallel to each other in the initial state.

Also, the magnetization M21 and the magnetization M22 are parallel or antiparallel to each other in the initial state, but the magnetization M21 and the magnetization M22 may be orthogonal to each other in the initial state. This case corresponds to, for example, a case in which, in the initial state, the first ferromagnetic layer 21 is an in-plane magnetization film in which the magnetization M21 is oriented in any direction in the xy plane, and the second ferromagnetic layer 22 is a perpendicular magnetization film in which the magnetization M22 is oriented in the z direction. Magnetic anisotropy causes the magnetization M21 to be oriented in any direction in the xy plane and the magnetization M22 to be oriented in the z direction, and thus the magnetizations M21 and M22 are orthogonal to each other in the initial state. Also, this relationship may be reversed. That is, in the initial state, the magnetization M21 may be oriented in the z direction, and the magnetization M22 may be oriented in any direction in the xy plane.

By the first magnetic element 2 converting the reflected light L2 into an electric signal, the second signal S2 corresponding to the application of the reflected light L2 to the first magnetic element 2 is generated. The second signal S2 is input to the circuit 3.

The second signal S2 is received by the signal receiving unit, and the number of counts when the signal receiving unit receives the second signal S2 is stored in the memory.

Figure 5:
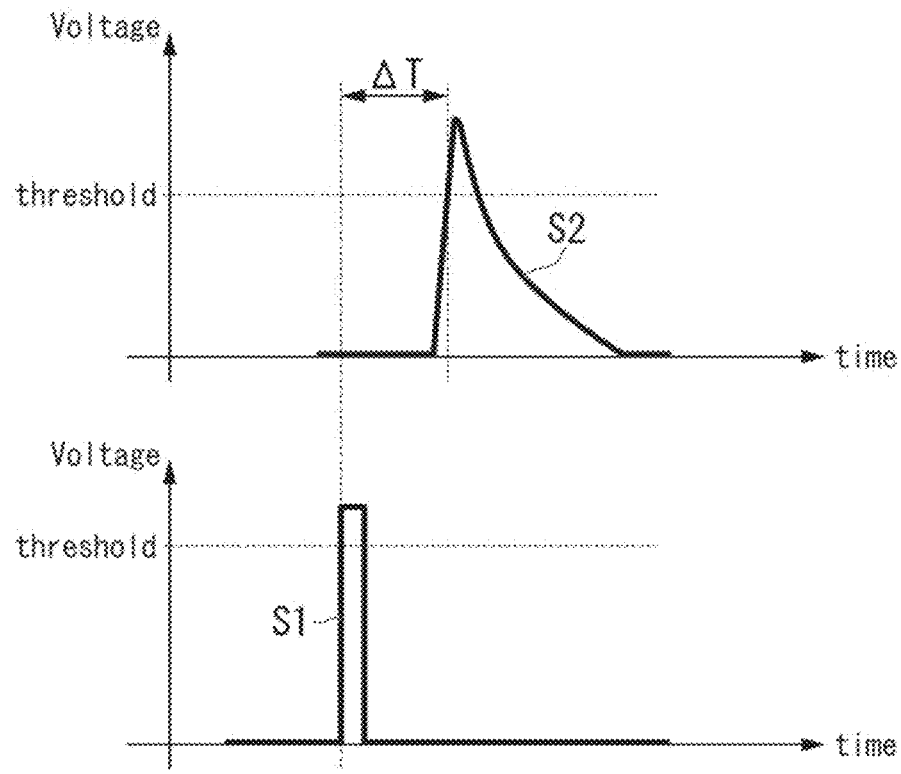
FIG. 5 is a diagram showing examples of a first signal and a second signal in the optical system according to the first embodiment.

The optical system 100 obtains the time difference ΔT between the emission of the light L1 from the light-emitting unit 1 and the application of the reflected light L2 to the first magnetic element 2, for example, on the basis of the first signal S1 and the second signal S2 input to the circuit 3. FIG. 5 is a diagram showing examples of the first signal S1 and the second signal S2 in the optical system 100 according to the first embodiment.

There is a time difference between the time when the first signal Si is input to the circuit 3 and the time when the second signal S2 is input to the circuit 3. This time difference corresponds to the time difference ΔT between the emission of the light L1 from the light-emitting unit 1 and the application of the reflected light L2 to the first magnetic element 2. The time difference ΔT is obtained, for example, as a difference between the time when the first signal S1 becomes greater than a predetermined threshold and the time when the second signal S2 becomes greater than the predetermined threshold. The time difference ΔT may be obtained as a difference between the time when the first signal S1 exhibits the maximum value and the time when the second signal S2 exhibits the maximum value.

The time difference ΔT is obtained from a difference between the number of counts when the first signal Si is received and the number of counts when the second signal S2 is received, which are stored in the memory. The counter of the circuit 3 counts clock pulses with a constant reference period. For that reason, the time difference ΔT can be obtained by obtaining a product of the difference between the numbers of counts and the reference period of the clock pulses. For example, in a case in which the light L1 is emitted by the light-emitting unit 1 at the n-th count of the counter and the first signal Si is received by the circuit 3, and the reflected light L2 is applied to the first magnetic element 2 at the m-th count and the second signal S2 is received by the circuit 3, when the reference period of the clock pulses is defined as t, the time difference ΔT is obtained by (m−n)×t.

Next, the circuit 3 performs an operation of obtaining the distance between the object Ob and the optical device 10 on the basis of the obtained time difference ΔT. When the time difference ΔT is multiplied by the speed of light, a distance of an optical path that extends from the light-emitting unit 1 to the object Ob and from the object Ob to the first magnetic element 2 is obtained. A distance from the light-emitting unit 1 to the object Ob and a distance between the first magnetic element 2 and the object Ob are assumed to be approximately the same, and the distance between the object Ob and the optical device 10 is obtained by dividing the time difference ΔT multiplied by the speed of light by 2.

Further, the circuit 3 may perform an operation of obtaining the stereoscopic image of the object Ob from the reflected light L2. In the case of obtaining the stereoscopic image of the object Ob, for example, the first magnetic elements 2 are disposed two-dimensionally. The stereoscopic image of the object Ob is obtained from information on positions of the first magnetic elements 2 irradiated with the reflected light L2 among the first magnetic elements 2 disposed two-dimensionally and information on distances between each of the first magnetic elements 2 and the object Ob, which are obtained from the time difference ΔT between the first signal and the second signal S2.

The information on the time difference ΔT between the emission of the light L1 from the light-emitting unit 1 and the application of the reflected light L2 to the first magnetic element 2, the distance between the optical device 10 and the object Ob, and the stereoscopic image of the object Ob is converted into signals and input to the external interface 4. The external interface 4 communicates with the external device 90 and outputs such information to the outside.

In a case in which the external device 90 has the arithmetic device for obtaining the time difference ΔT between the emission of the light L1 from the light-emitting unit 1 and the application of the reflected light L2 to the first magnetic element 2, the distance between the optical device 10 and the object Ob, and the stereoscopic image of the object Ob, calculations for obtaining these are performed by the external device 90 instead of the circuit 3. In a case in which these calculations are performed by the external device 90, the first signal S1 and the second signal S2 are transmitted to the external device 90 via the external interface 4.

As described above, the optical system 100 according to the first embodiment can obtain the time difference ΔT between the emission of the light L1 from the light-emitting unit 1 and the application of the reflected light L2 to the first magnetic element 2, the distance between the optical device 10 and the object Ob, and the stereoscopic image of the object Ob on the basis of the first signal S1 and the second signal S2.

Further, since the optical system 100 according to the first embodiment detects the reflected light L2 using the first magnetic element 2, it can accurately measure the time difference ΔT, the distance between the optical device 10 and the object Ob, the stereoscopic image of the object Ob, and the like. This is because the first magnetic element 2 exhibits a faster speed, at which an output of an electric signal rises after light is received, than that of a photodetector using a silicon semiconductor.

Figure 6:
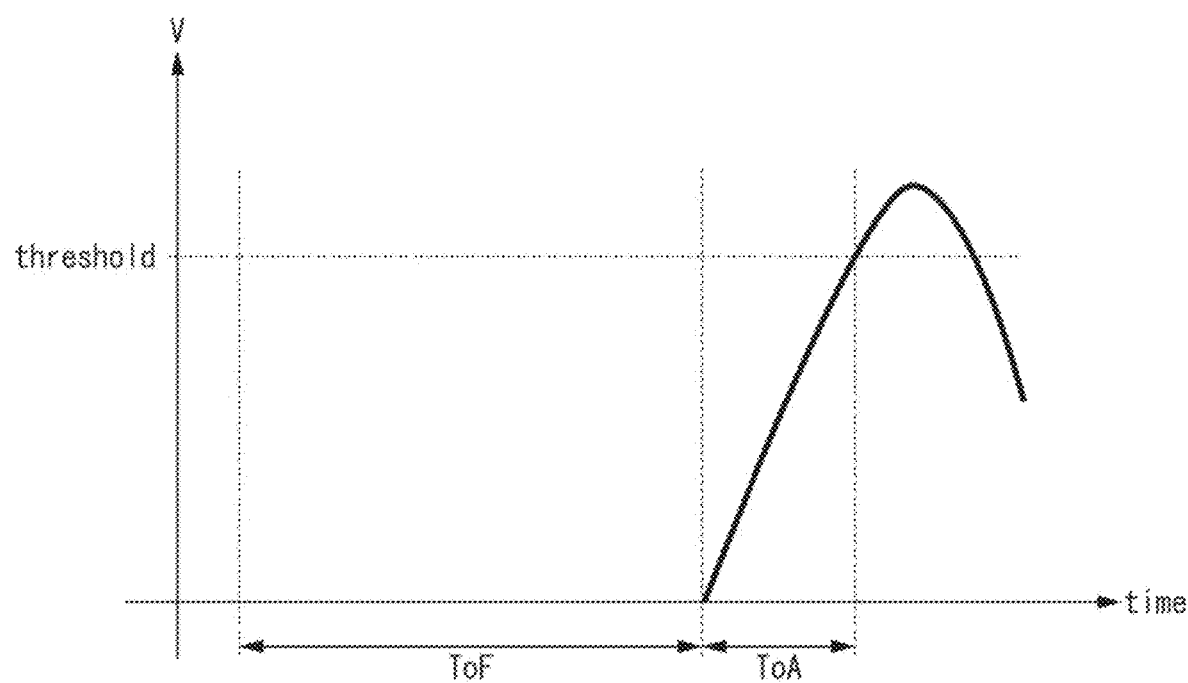
FIG. 6 is a diagram showing a change of an output voltage from the first magnetic element with the lapse of time in the optical system according to the first embodiment.
Figure 7:
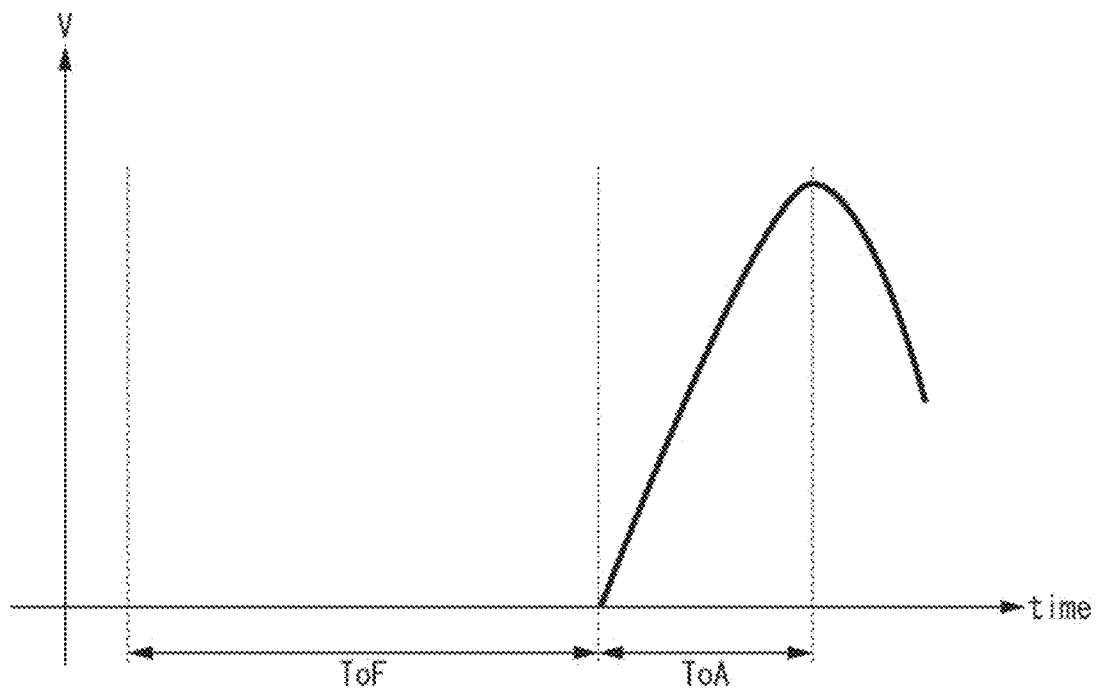
FIG. 7 is a diagram showing a change of the output voltage from the first magnetic element with the lapse of time in the optical system according to the first embodiment.

FIG. 6 shows a change in the output voltage from the first magnetic element 2 with the lapse of time in the optical system 100 according to the first embodiment. The output voltage from the first magnetic element 2 from when the light L1 is emitted by the light-emitting unit 1 until the reflected light L2 is applied to the first magnetic element 2 is the first value (for example, 0 V). The time from when the light L1 is emitted by the light-emitting unit 1 until the reflected light L2 is applied to the first magnetic element 2 is called time of flight (ToF). When the reflected light L2 is applied to the first magnetic element 2, the output voltage from the first magnetic element 2 gradually increases and exceeds a predetermined threshold. The time from when the light (the reflected light L2 in the first embodiment) is applied to the first magnetic element 2 until the output of the first magnetic element 2 becomes larger than the predetermined threshold is called time of arrival (ToA) of the first magnetic element 2. As shown in FIG. 7, the time from when the light (the reflected light L2 in the first embodiment) is applied to the first magnetic element 2 until the output of the first magnetic element 2 reaches its maximum may be used for ToA of the first magnetic element 2. The first magnetic element 2 has a shorter ToA than a photodetector using a silicon semiconductor.

The time difference ΔT between the emission of the light L1 from the light-emitting unit 1 and the application of the reflected light L2 to the first magnetic element 2 is the sum of ToF and ToA. On the other hand, a parameter relating to the distance between the object Ob and the light-emitting unit 1 is ToF, and ToA is a ranging error. The first magnetic element 2 has a shorter ToA, and thus as compared to a photodetector using a silicon semiconductor, it can accurately measure the time difference ΔT, the distance between the optical device 10 and the object Ob, the stereoscopic image of the object Ob, and the like.

Second Embodiment

Figure 8:
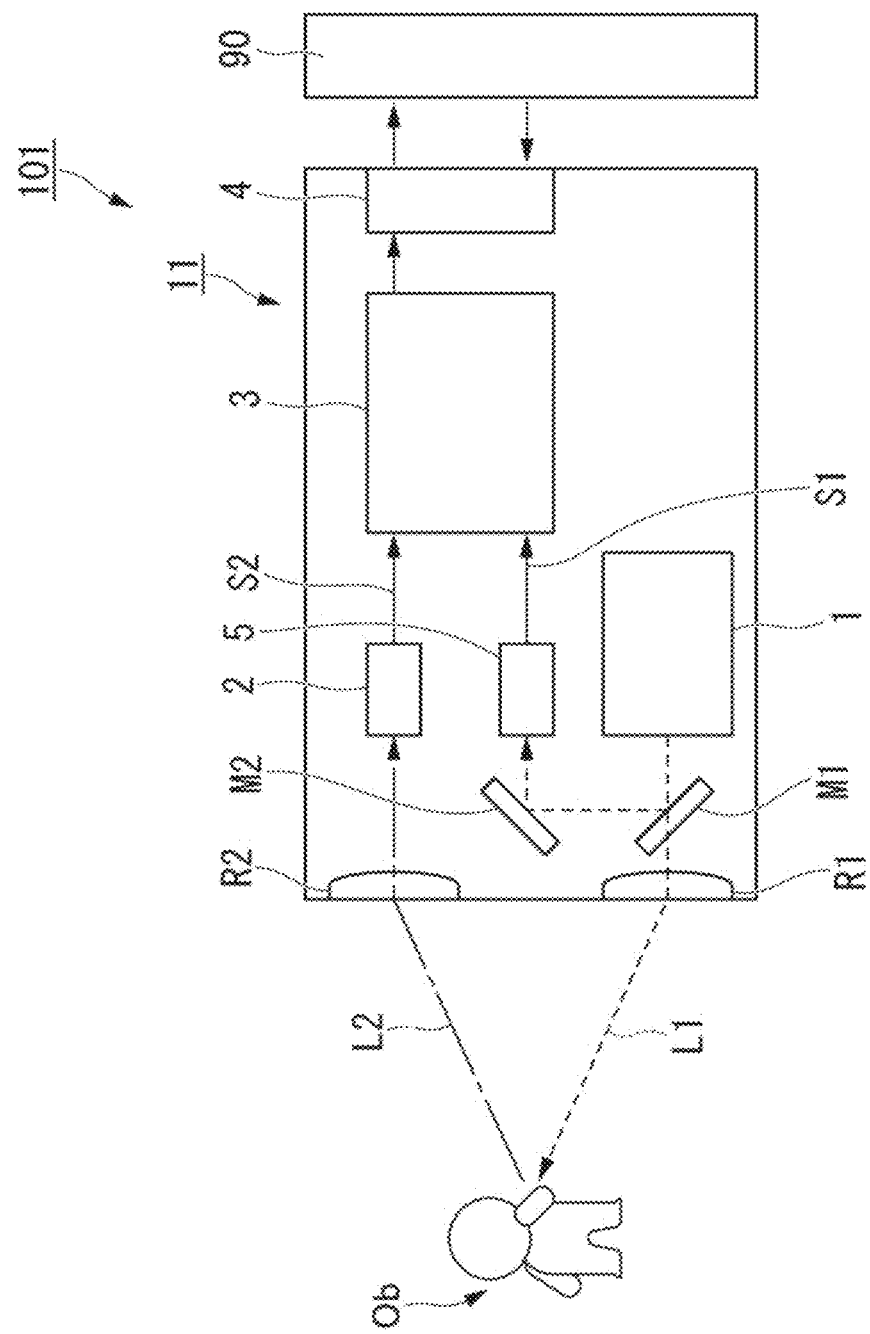
FIG. 8 is a schematic diagram of an optical system according to a second embodiment.

FIG. 8 is a schematic diagram of an optical system 101 according to a second embodiment. The optical system 101 according to the second embodiment is different from the optical system 100 according to the first embodiment in a configuration of an optical device 11. In the optical system 101, the same constituent elements as in the optical system 100 will be denoted by the same reference numerals, and description thereof will be omitted.

The optical device 11 includes, for example, the light-emitting unit 1, the first magnetic element 2, the circuit 3, the external interface 4, the second magnetic element 5, the lenses R1 and R2, and mirrors M1 and M2.

A part of the light L1 emitted by the light-emitting unit 1 passes through the mirror M1, becomes collimated light via the lens R1, and reaches the object Ob. Also, a part of the light L1 emitted by the light-emitting unit 1 is applied to the second magnetic element 5 via the mirrors M1 and M2. The mirror M1 is, for example, a half mirror. An optical path length of the light L1 between the light-emitting unit 1 and the second magnetic element 5 is so small that it can be ignored with respect to an optical path length of the light L1 between the light-emitting unit 1 and the object Ob.

Figure 9:
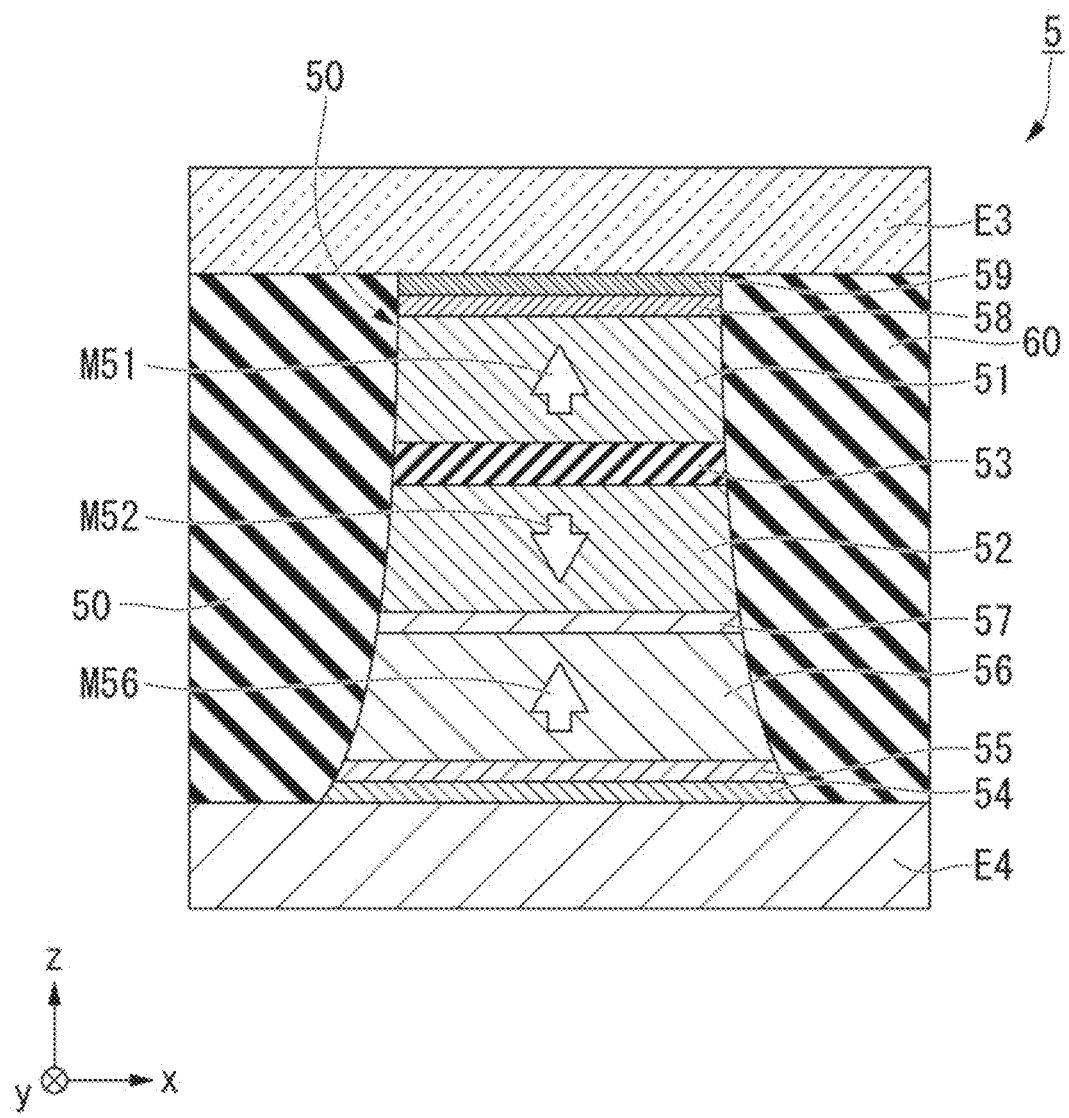
FIG. 9 is a cross-sectional view of a second magnetic element according to the second embodiment.

FIG. 9 is a cross-sectional view of the second magnetic element 5 according to the second embodiment. In FIG. 9, directions of magnetization in initial states of ferromagnetic materials are indicated by arrows.

The second magnetic element 5 has at least a third ferromagnetic layer 51, a fourth ferromagnetic layer 52, and a second spacer layer 53. The second spacer layer 53 is located between the third ferromagnetic layer 51 and the fourth ferromagnetic layer 52. In addition to these, the second magnetic element 5 may have a buffer layer 54, a seed layer 55, a ferromagnetic layer 56, a magnetic coupling layer 57, a perpendicular magnetization inducing layer 58, a cap layer 59, and an insulating layer 60. Also, the second magnetic element 5 is sandwiched between a third electrode E3 and a fourth electrode E4.

The third ferromagnetic layer 51, the fourth ferromagnetic layer 52, the second spacer layer 53, the buffer layer 54, the seed layer 55, the ferromagnetic layer 56, the magnetic coupling layer 57, the perpendicular magnetization inducing layer 58, the cap layer 59, and the insulating layer 60 respectively correspond to and have the same configurations as the first ferromagnetic layer 21, the second ferromagnetic layer 22, the spacer layer 23, the buffer layer 24, the seed layer 25, the ferromagnetic layer 26, the magnetic coupling layer 27, the perpendicular magnetization inducing layer 28, the cap layer 29, and the insulating layer 30 of the first magnetic element 2. The third electrode E3 and the fourth electrode E4 respectively correspond to and have the same configuration as the first electrode E1 and the second electrode E2 of the first magnetic element 2. Magnetization M51, magnetization M52, and magnetization M56 respectively correspond to the magnetization M21, the magnetization M22, and the magnetization M26 in the first magnetic element 2.

The second magnetic element 5 has the same mechanism as the first magnetic element 2, and an output voltage, which is an electric signal, is generated from the second magnetic element 5 when light is applied to the second magnetic element 5.

The first signal S1 and the second signal S2 are input to the circuit 3. The first signal S1 is input to the circuit 3 from the second magnetic element 5. The first signal S1 is a signal corresponding to the emission of the light L1 of the light-emitting unit 1 and is an electric signal generated from the second magnetic element 5 when a part of the light L1 is applied to the second magnetic element 5, for example.

Operations of the optical system 101 according to the second embodiment are different from those of the optical system 100 in that the first signal S1 is input from the second magnetic element 5 to the circuit 3. A part of the light L1 emitted by the light-emitting unit 1 via the mirrors M1 is applied to the second magnetic element 5. The second magnetic element 5 outputs the first signal S1, which is an electric signal, when a part of the light L1 is applied to the second magnetic element 5. The first signal S1 is input to the circuit 3.

Figure 10:
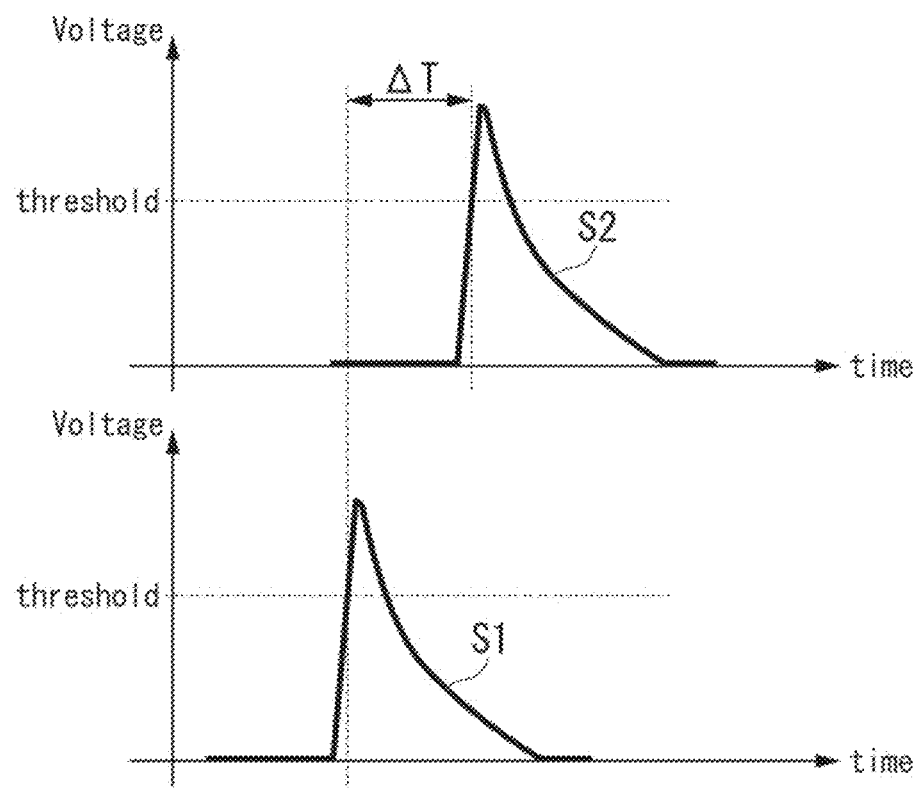
FIG. 10 is diagrams showing examples of a first signal and a second signal in an optical system according to the second embodiment.

FIG. 10 is a diagram showing examples of the first signal S1 and the second signal S2 in the optical system 101 according to the second embodiment. There is a time difference between the time when the first signal S1 is input to the circuit 3 and the time when the second signal S2 is input to the circuit 3. In the optical system 101, a time difference between the emission of the light L1 from the light-emitting unit 1 and the application of a part of the light L1 to the second magnetic element 5 is so small that it can be ignored. Accordingly, the time difference between the time when the first signal S1 is input to the circuit 3 and the time when the second signal S2 is input to the circuit 3 corresponds to the time difference $\Delta T$ between the emission of the light L1 from the light-emitting unit 1 and the application of the reflected light L2 to the first magnetic element 2. The time difference $\Delta T$ is obtained, for example, as the difference between the time when the first signal S1 becomes greater than a predetermined threshold and the time when the second signal S2 becomes greater than the predetermined threshold. The time difference $\Delta T$ may be obtained as the difference between the time when the first signal S1 exhibits the maximum value and the time when the second signal S2 exhibits the maximum value.

The operations in the circuit 3, the external interface 4, and the external device 90 are the same as in the optical system 100.

Similarly to the optical system 100 according to the first embodiment, the optical system 101 according to the second embodiment can obtain the time difference $\Delta T$ between the emission of the light L1 from the light-emitting unit 1 and the application of the reflected light 122 to the first magnetic element 2, the distance between the optical device 11 and the object Ob, or the stereoscopic image of the object Ob on the basis of the first signal S1 and the second signal S2. Also, since the optical system 101 according to the second embodiment detects the reflected light L2 using the first magnetic element 2, it can accurately measure the time difference $\Delta T$, the distance between the optical device 11 and the object Ob, the stereoscopic image of the object Ob, and the like. Further, the optical system 101 according to the second embodiment detects the reflected light L2 using the first magnetic element 2 and detects the light L1 using the second magnetic element 5, and thus by using two magnetic elements having similar values of aforementioned ToA for the first magnetic element 2 and the second magnetic element 5, it can more accurately measure the time difference $\Delta T$, the distance between the optical device 11 and the object Ob, the stereoscopic image of the object Ob, and the like.

Third Embodiment

Figure 11:
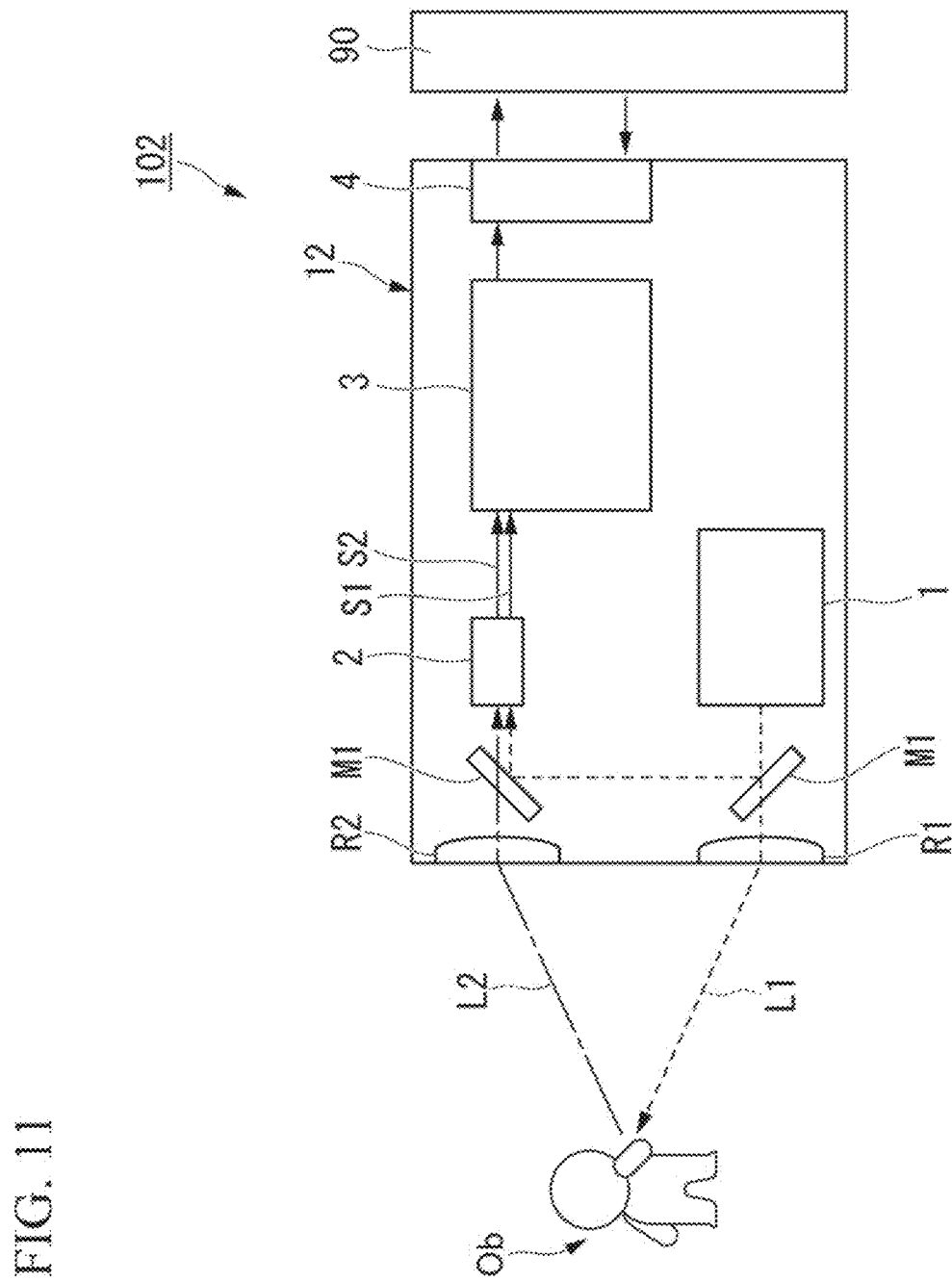
FIG. 11 is a schematic diagram of an optical system according to a third embodiment.

FIG. 11 is a schematic diagram of an optical system 102 according to a third embodiment. The optical system 102 according to the third embodiment is different from the optical system 100 according to the first embodiment in a configuration of an optical device 12. In the optical system 102, the same constituent elements as in the optical system 100 will be denoted by the same reference numerals, and description thereof will be omitted.

The optical device 12 includes, for example, the light-emitting unit 1, the first magnetic element 2, the circuit 3, the external interface 4, the lenses R1 and R2, and the mirrors M1.

A part of the light L1 emitted by the light-emitting unit 1 becomes collimated light via the lens R1 and reaches the object Ob. Also, a part of the light L1 emitted by the light-emitting unit 1 via the mirrors M1 is applied to the first magnetic element 2. Further, as shown in FIG. 11, the reflected light L2 from the object Ob also passes through the lens R2 and the mirror M1 and is applied to the first magnetic element 2. The mirror M1 is, for example, a half mirror. The optical path length of the light L1 between the light-emitting unit 1 and the first magnetic element 2 is so small that it can be ignored with respect to the optical path length of the light L1 between the light-emitting unit 1 and the object Ob.

Figure 12:
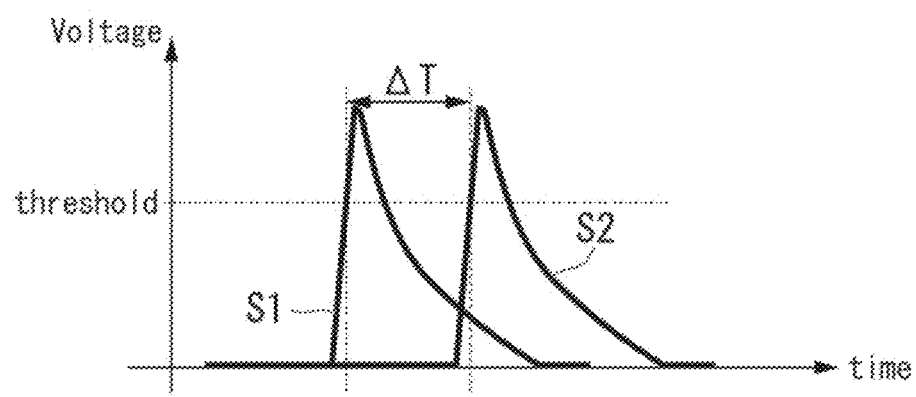
FIG. 12 is diagrams showing examples of a first signal and a second signal in the optical system according to the third embodiment.

The first signal S1 and the second signal S2 are input to the circuit 3. FIG. 12 is a diagram showing examples of the first signal S1 and the second signal S2 in the optical system 102 according to the third embodiment. Both of the first signal S1 and the second signal S2 are input from the first magnetic element 2 to the circuit 3. The first signal S1 is a signal corresponding to the emission of the light L1 from the light-emitting unit 1 and is an electric signal generated from the first magnetic element 2 when a part of the light L1 is applied to the first magnetic element 2, for example. The second signal S2 is a signal corresponding to irradiation on the first magnetic element with the reflected light L2 and is an electric signal generated from the second magnetic element 2 when the reflected light L2 is applied to the first magnetic element 2, for example. There is a time difference between the time when the first signal S1 is input to the circuit 3 and the time when the second signal S2 is input to the circuit 3. In the optical system 102, the time difference between the emission of the light L1 from the light-emitting unit 1 and the application of a part of the light L1 to the first magnetic element 2 is so small that it can be ignored. Accordingly, the time difference between the time when the first signal S1 is input to the circuit 3 and the time when the second signal S2 is input to the circuit 3 corresponds to the time difference $\Delta T$ between the emission of the light L1 from the light-emitting unit 1 and the application of the reflected light L2 to the first magnetic element 2. The time difference $\Delta T$ is obtained, for example, as the difference between the time when the first signal S1 becomes greater than a predetermined threshold and the time when the second signal S2 becomes greater than the predetermined threshold. The time difference $\Delta T$ may be obtained as the difference between the time when the first signal S1 exhibits the maximum value and the time when the second signal 82 exhibits the maximum value.

The operations in the circuit 3, the external interface 4, and the external device 90 are the same as in the optical system 100. Also, in the optical device 12 of the optical system 102, as in the optical device 10 of the optical system 100, the first magnetic elements 2 may be arranged one-dimensionally or two-dimensionally, but in this case, the arranged first magnetic elements 2 may be irradiated with the light L1, or one of the arranged first magnetic elements 2 may be irradiated with the light L1.

Similarly to the optical system 100 according to the first embodiment, the optical system 102 according to the third embodiment can obtain the time difference ΔT between the emission of the light L1 from the light-emitting unit 1 and the application of the reflected light L2 to the first magnetic element 2, the distance between the optical device 12 and the object Ob, or the stereoscopic image of the object Ob on the basis of the first signal S1 and the second signal S2. Also, since the optical system 102 according to the third embodiment detects the reflected light L2 using the first magnetic element 2, it can accurately measure the time difference ΔT, the distance between the optical device 12 and the object Ob, the stereoscopic image of the object Ob, and the like. Further, by detecting the reflected light L2 and the light L1 using the same first magnetic element 2, the optical system 102 according to the third embodiment can reduce a difference between: the value of ToA when a part of the light L1 is applied to the first magnetic element 2; and the value of ToA when the reflected light L2 is applied to the first magnetic element 2, and thus it can more accurately measure the time difference ΔT, the distance between the optical device 11 and the object Ob, the stereoscopic image of the object Ob, and the like.

Fourth Embodiment

Figure 13:
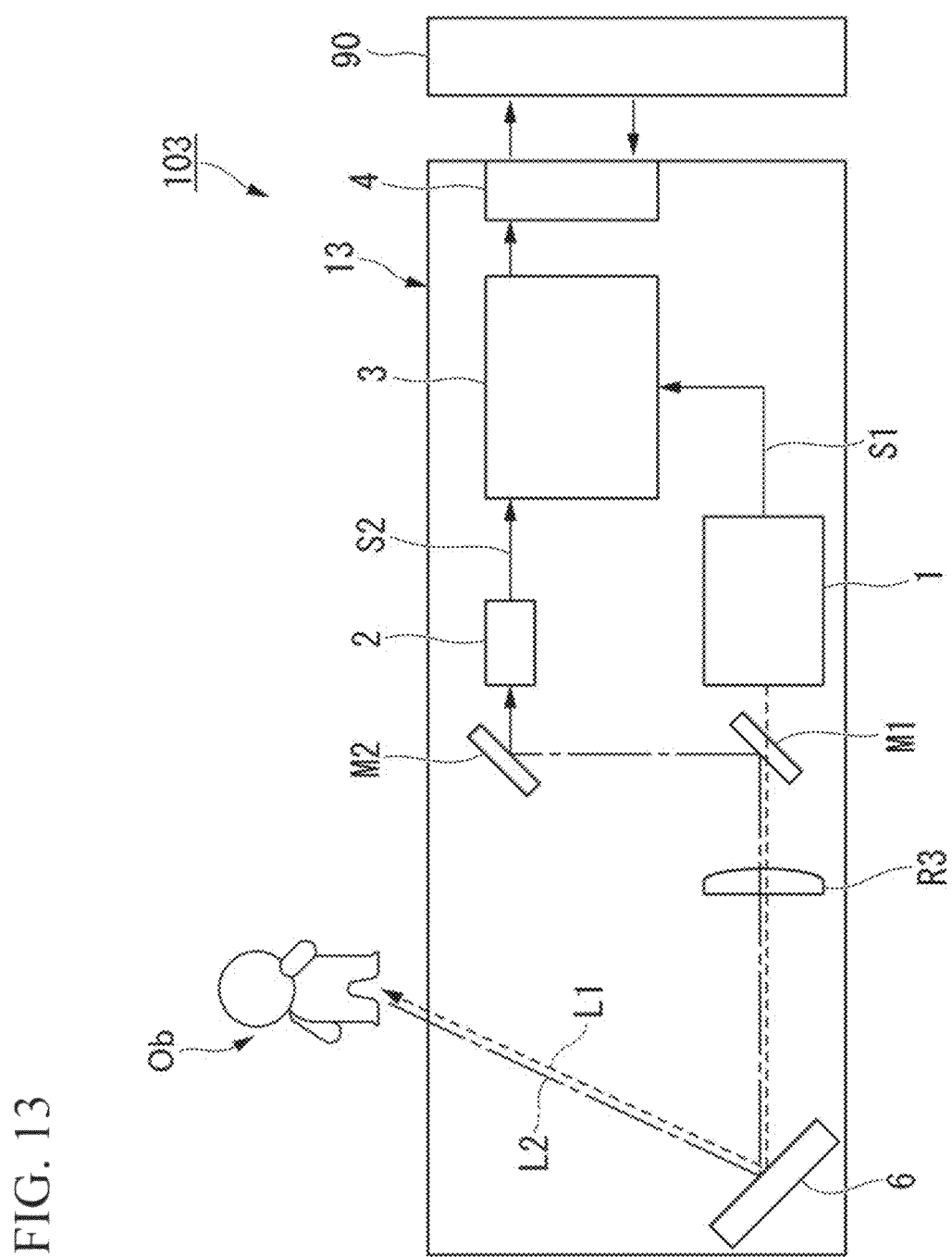
FIG. 13 is a schematic diagram of an optical system according to a fourth embodiment.

FIG. 13 is a schematic diagram of an optical system 103 according to a fourth embodiment. The optical system 103 according to the fourth embodiment is different from the optical system 100 according to the first embodiment in a configuration of an optical device 13. In the optical system 103, the same constituent elements as in the optical system 100 will be denoted by the same reference numerals, and description thereof will be omitted.

The optical device 13 includes, for example, the light-emitting unit 1, the first magnetic element 2, the circuit 3, the external interface 4, an optical scanning mirror 6, a lens R3, and the mirrors M1 and M2. The lens R3 collimates the light L1 and condenses the reflected light L2. The first signal S1 is input from the light-emitting unit 1 to the circuit 3.

The optical scanning mirror 6 is, for example, a two-axis MEMS mirror that changes a reflection direction of light horizontally and vertically. The optical scanning mirror 6 can scan an irradiation position of light on the object Ob by changing the reflection direction of the light L1. The optical system 103 three-dimensionally scans the irradiation position of light on the object Ob using the optical scanning mirror 6. The light L1 emitted by the light-emitting unit 1 is reflected by the optical scanning mirror 6 and is applied to the object Ob, and the reflected light L2 from the object Ob is reflected by the optical scanning mirror and is applied to the first magnetic element 2. In the optical device 13 shown in FIG. 13, the light L1 emitted by the light-emitting unit 1 passes through the mirror M1 and then becomes collimated light via the lens R3. The mirror M1 is, for example, a half mirror. The collimated light L1 is reflected by the optical scanning mirror 6 and applied to the object Ob. The reflected light L2 from the object Ob is reflected by the optical scanning mirror 6, then condensed by the lens R3, and applied to the first magnetic element 2 via the mirrors M1 and M2.

Similarly to the optical system 100 according to the first embodiment, the optical system 103 according to the fourth embodiment can obtain the time difference ΔT between the emission of the light L1 from the light-emitting unit 1 and the application of the reflected light L2 to the first magnetic element 2, the distance between the optical device 13 and the object Ob, or the stereoscopic image of the object Ob on the basis of the first signal S1 and the second signal S2. Also, by performing measurement while changing the irradiation position of light on the object Ob using the optical scanning mirror 6, the optical system 103 can measure the distance between the optical device 13 and the object Ob for each position of the object Ob and can obtain the stereoscopic image of the object Ob from this information. The optical system 103 can obtain the stereoscopic image of the object Ob even with one first magnetic element 2. The first magnetic elements 2 may be arranged one-dimensionally or two-dimensionally along a plane that intersects the irradiation direction of the reflected light L2. Further, since the optical system 103 according to the fourth embodiment detects the reflected light L2 using the first magnetic element 2, it can accurately measure the time difference ΔT, the distance between the optical device 13 and the object Ob, the stereoscopic image of the object Ob, and the like.

Fifth Embodiment

Figure 14:
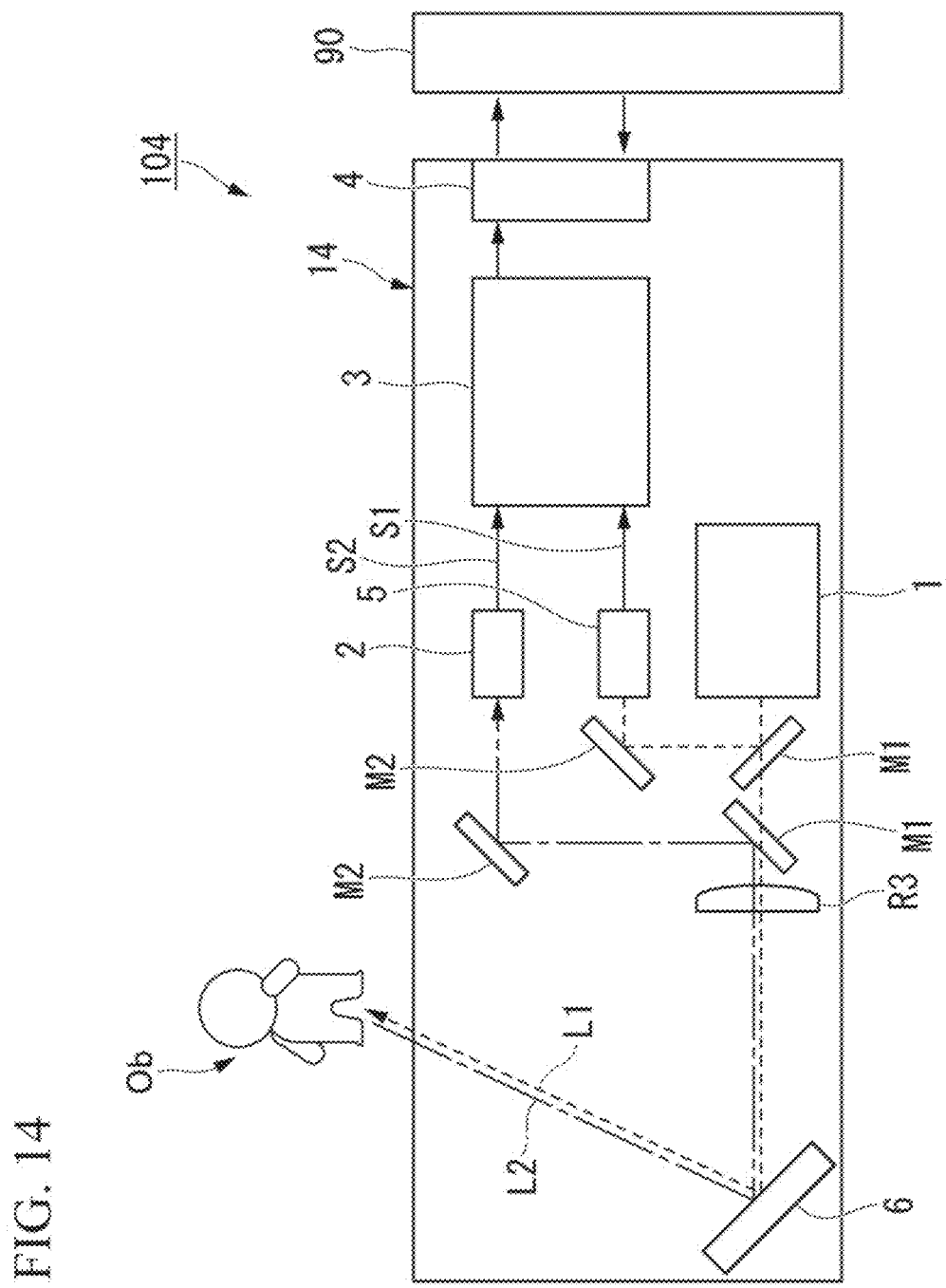
FIG. 14 is a schematic diagram of an optical system according to a fifth embodiment.

FIG. 14 is a schematic diagram of an optical system 104 according to a fifth embodiment. The optical system 104 according to the fifth embodiment is different from the optical system 101 according to the second embodiment in a configuration of an optical device 14. In the optical system 104, the same constituent elements as in the optical system 101 will be denoted by the same reference numerals, and description thereof will be omitted.

The optical device 14 is obtained by applying the optical scanning mirror 6, which is a featured configuration of the optical device 13 according to the fourth embodiment, to the optical device 11 according to the second embodiment. The optical device 14 includes, for example, the light-emitting unit 1, the first magnetic element 2, the circuit 3, the external interface 4, the second magnetic element 5, the optical scanning mirror 6, the lens R3, and the mirrors M1 and M2. The optical system 104 three-dimensionally scans the irradiation position of light on the object Ob using the optical scanning mirror 6.

In the optical device 14 shown in FIG. 14, a part of the light L1 emitted by the light-emitting unit 1 passes through the mirrors M1 and then becomes collimated light via the lens R3. The mirror M1 is, for example, a half mirror. The collimated light L1 is reflected by the optical scanning mirror 6 and applied to the object Ob. The reflected light L2 from the object Ob is reflected by the optical scanning mirror 6, then condensed by the lens R3, and applied to the first magnetic element 2 via the mirrors M1 and M2.

The optical system 104 according to the fifth embodiment has the same effects as the optical system 103 according to the fourth embodiment.

Sixth Embodiment

Figure 15:
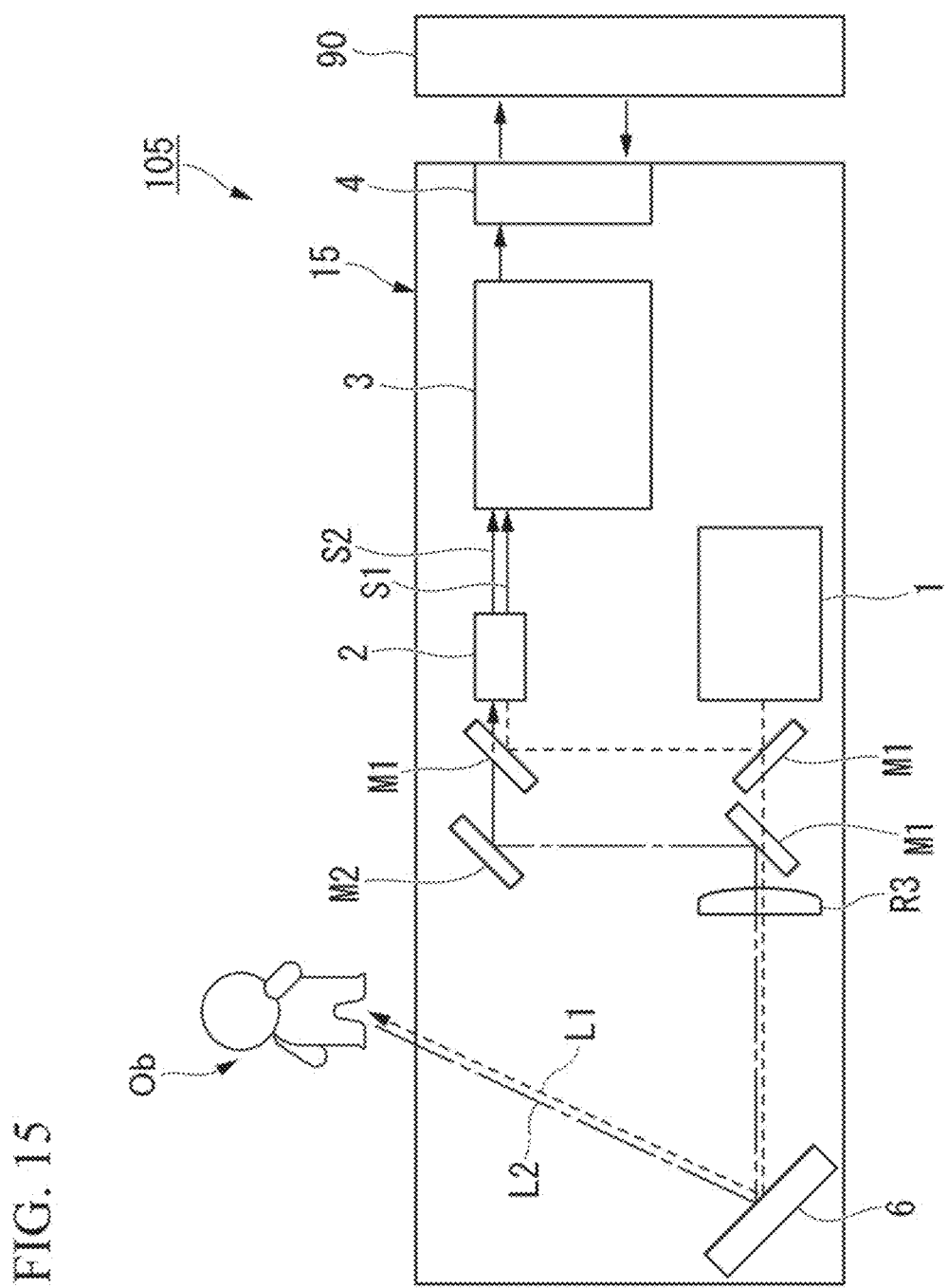
FIG. 15 is a schematic diagram of an optical system according to a sixth embodiment.

FIG. 15 is a schematic diagram of an optical system 105 according to a sixth embodiment. The optical system 105 according to the sixth embodiment is different from the optical system 102 according to the third embodiment in a configuration of an optical device 15. In the optical system 105, the same constituent elements as in the optical system 102 will be denoted by the same reference numerals, and description thereof will be omitted.

The optical device 15 is obtained by applying the optical scanning mirror 6, which is a featured configuration of the optical device 13 according to the fourth embodiment, to the optical device 12 according to the third embodiment. The optical device 15 includes, for example, the light-emitting unit 1, the first magnetic element 2, the circuit 3, the external interface 4, the optical scanning mirror 6, the lens R3, the mirrors M1, and the mirror M2. The optical system 105 three-dimensionally scans the irradiation position of the light on the object Ob using the optical scanning mirror 6.

In the optical device 14 shown in FIG. 15, a part of the light L1 emitted by the light-emitting unit 1 passes through the mirrors M1 and then becomes collimated light via the lens R3. The mirror M1 is, for example, a half mirror. The collimated light L1 is reflected by the optical scanning mirror 6 and applied to the object Ob.

The reflected light 12 from the object Ob is reflected by the optical scanning mirror 6, then condensed by the lens R3, and applied to the first magnetic element 2 via the mirrors M1 and M2.

The optical system 105 according to the sixth embodiment has the same effects as the optical system 103 according to the fourth embodiment.

The optical systems according to the above embodiments can be used for various purposes such as automatic driving and surveying and can be used by being mounted on various devices such as automobiles, aircrafts, robots, and smartphones, for example. Also, the optical systems according to the above embodiments can be applied to, for example, mixed reality (MR) glasses, virtual reality (VR) glasses, and the like.

Application Examples

Figure 16:
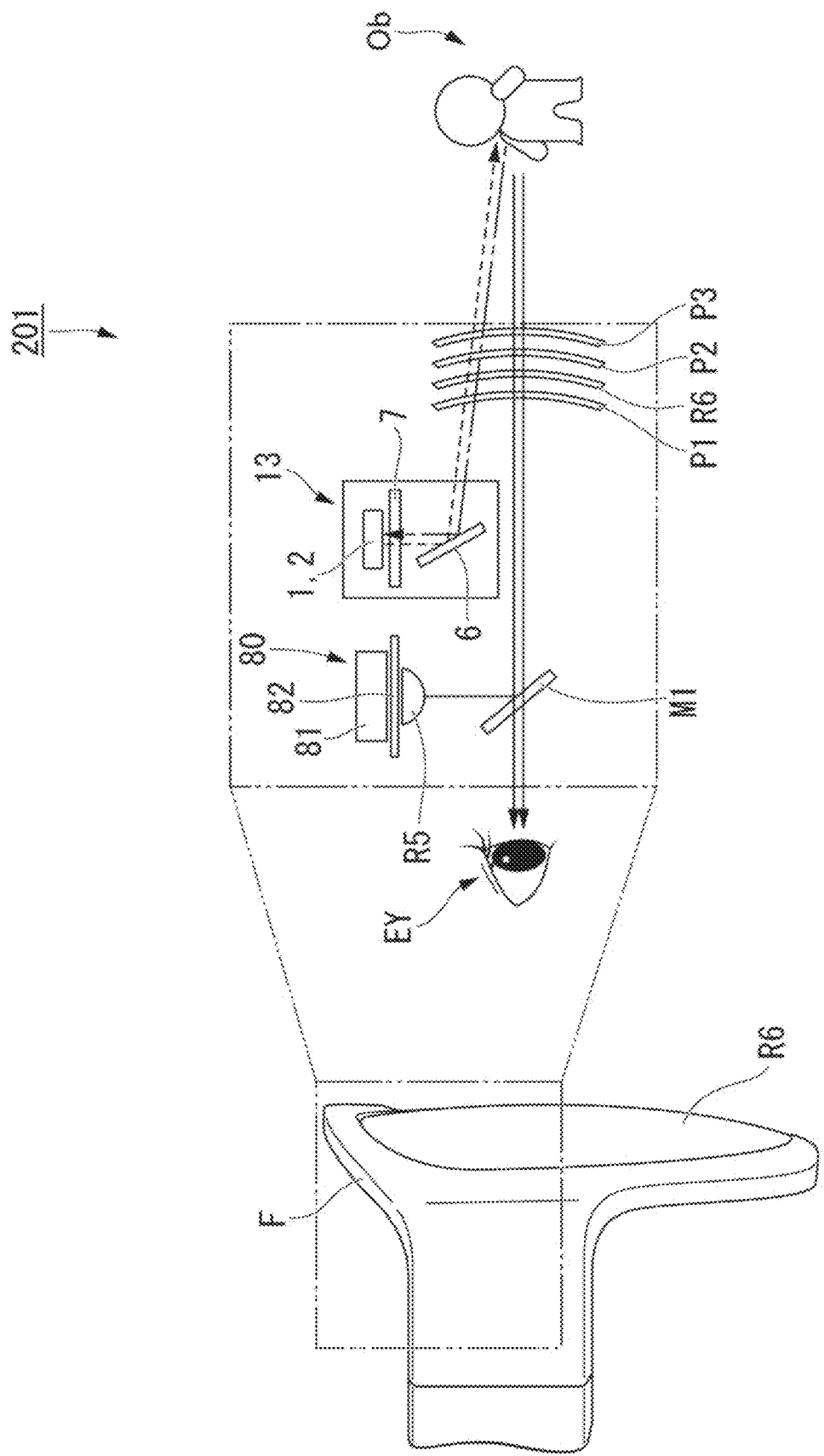
FIG. 16 is a schematic diagram of an application example of the optical system.

FIG. 16 is a schematic diagram of a device 201 according to a second application example. The device 201 is, for example, MR glasses.

The device 201 has the optical device 13 and an imaging device 80 in a frame F above a lens R6 of spectacles. Here, the optical device 13 is taken as an example, but optical devices according to other embodiments may be used.

The imaging device 80 has a light-emitting unit 81, an s-polarizing plate 82, and a lens R5. The light-emitting unit 81 includes, for example, red, green, and blue laser diodes. An image output from the light-emitting unit 81 is reflected by the mirror M1 and the lens R6 and enters eyes EY.

$\lambda/4$ plates P1 and P2 are disposed on both surfaces of the lens R6, and an s-polarizing plate P3 is disposed on the outermost surface of the lens R6. The image output from the light-emitting unit 81 becomes s-polarized light by passing through the s-polarizing plate 82. The s-polarized image becomes p-polarized by passing through the $\lambda/4$ plate P1 and the $\lambda/4$ plate P2. Since the s-polarizing plate P3 cuts p-polarized light, the image output from the light-emitting unit 81 is not output outside the lens R6.

The optical device 13 has, for example, a p-polarizing plate 7 between the light-emitting unit 1 and the optical scanning mirror 6. Light emitted from the light-emitting unit 1 becomes p-polarized light by passing through the p-polarizing plate. The p-polarized light becomes s-polarized light by passing through the $\lambda/4$ plate P1 and the $\lambda/4$ plate P2, passes through the s-polarizing plate P3, and is applied to the object Ob. Reflected light from the object Ob passes through the s-polarizing plate P3, the $\lambda/4$ plate P2, the lens R6, and the $\lambda/4$ plate P1, is reflected by the optical scanning mirror 6, and is then applied to the first magnetic element 2. The optical system 103 having the optical device 13 measures the distance between itself and the object Ob and the stereoscopic image of the object Ob. These pieces of information measured by the optical system 103 are sent to the imaging device 80 and reflected in the image output from the light-emitting unit 81. The object Ob that actually exists and a virtual image are simultaneously projected onto human eyes EY.

Although an example in which the optical device 13 is provided inside the lens R6 is shown here, the optical device 13 may be provided outside the lens R6. In this case, it is not required to define polarization of the light output from the optical device 13.

While embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. An optical device comprising:
   a light-emitting unit that is configured to emit a light;
   a first magnetic element; and
   a circuit,
   wherein the first magnetic element includes a first ferromagnetic layer, a second ferromagnetic layer, and a spacer layer sandwiched between the first ferromagnetic layer and the second ferromagnetic layer,
   a reflected light reflected by an object to be irradiated with the light is applied to the first magnetic element,
   a first signal corresponding to an emission of the light from the light-emitting unit is input to the circuit, and
   a second signal corresponding to an application of the reflected light to the first magnetic element is input from the first magnetic element to the circuit.

2. The optical device according to claim 1, wherein the first signal is input from the light-emitting unit to the circuit.

3. The optical device according to claim 1 further comprising a second magnetic element,
   wherein the second magnetic element includes a third ferromagnetic layer, a fourth ferromagnetic layer, and a second spacer layer sandwiched between the third ferromagnetic layer and the fourth ferromagnetic layer,
   a part of the light emitted by the light-emitting unit is applied to the second magnetic element, and
   the first signal is input to the circuit from the second magnetic element.

4. The optical device according to claim 1,
   wherein a part of the light emitted by the light-emitting unit is applied to the first magnetic element, and
   the first signal is input to the circuit from the first magnetic element.

5. The optical device according to claim 1, further comprising an optical scanning mirror,
   wherein at least a part of the light emitted by the light-emitting unit is reflected by the optical scanning mirror and applied to the object, and the reflected light from the object is reflected by the optical scanning mirror and applied to the first magnetic element.

6. An optical system comprising the optical device according to claim 1,
wherein a time difference between: an emission of the light by the light-emitting unit; and an application of the reflected light to the first magnetic element, is obtained on a basis of the first signal and the second signal input to the circuit.

7. The optical system according to claim 6, wherein a distance between the object and the optical device is obtained on a basis of the time difference.

8. An optical system comprising the optical device according to claim 1,
wherein a stereoscopic image of the object is obtained from the reflected light.

* * * * *